(12) United States Patent
Kimura et al.

(10) Patent No.: US 10,126,585 B2
(45) Date of Patent: Nov. 13, 2018

(54) LIQUID CRYSTAL DISPLAY DEVICE

(71) Applicant: TOPPAN PRINTING CO., LTD., Tokyo (JP)

(72) Inventors: Yukihiro Kimura, Tokyo (JP); Kenzo Fukuyoshi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 91 days.

(21) Appl. No.: 15/248,585

(22) Filed: Aug. 26, 2016

(65) Prior Publication Data

US 2016/0363797 A1  Dec. 15, 2016

Related U.S. Application Data

(63) Continuation of application No. PCT/JP2014/063835, filed on May 26, 2014.

(30) Foreign Application Priority Data

Feb. 28, 2014 (JP) ................ 2014-038822

(51) Int. Cl.
  *G02F 1/1333* (2006.01)
  *G06F 3/041* (2006.01)
  (Continued)

(52) U.S. Cl.
  CPC ........ *G02F 1/13338* (2013.01); *G02F 1/1368* (2013.01); *G02F 1/13439* (2013.01);
  (Continued)

(58) Field of Classification Search
  CPC ............... G02F 1/13338; G02F 1/1343; G02F 1/133707; G02F 1/1368; G02F 1/133512;
  (Continued)

(56) References Cited

U.S. PATENT DOCUMENTS

2008/0062140 A1  3/2008  Hotelling et al.
2008/0062147 A1*  3/2008  Hotelling ............ G02F 1/13338
  345/174
(Continued)

FOREIGN PATENT DOCUMENTS

JP  2653014 B2  9/1997
JP  2008-281932 A  11/2008
(Continued)

OTHER PUBLICATIONS

International Search Report for International Patent Application No. PCT/JP2014/063835 dated Jul. 22, 2014.
(Continued)

*Primary Examiner* — Angela Davison
(74) *Attorney, Agent, or Firm* — Foley & Lardner LLP

(57) ABSTRACT

In a liquid crystal display device, a plurality of first light absorptive resin layer patterns, a plurality of metal layer patterns, a plurality of second light absorptive resin layer patterns, a transparent resin layer, and a plurality of transparent electrode patterns are laminated in this order on a surface of a first transparent substrate facing a liquid crystal layer; the plurality of the first light absorptive resin layer patterns, the plurality of the metal layer patterns, and the plurality of the second light absorptive resin layer patterns have openings formed therein, and are formed into the same shape when viewed in a laminating direction; the plurality of the metal layer patterns are arrayed in a first direction, being insulated from each other, the plurality of the transparent electrode patterns are arrayed in a second direction perpendicular to the first direction, being insulated from each other.

17 Claims, 17 Drawing Sheets

(51) Int. Cl.
    *G06F 3/044*      (2006.01)
    *G02F 1/1343*     (2006.01)
    *G02F 1/1368*     (2006.01)
    *G02F 1/1337*     (2006.01)
    *G02F 1/1335*     (2006.01)

(52) U.S. Cl.
    CPC .. *G02F 1/133345* (2013.01); *G02F 1/133707* (2013.01); *G06F 3/044* (2013.01); *G06F 3/0412* (2013.01); *G02F 1/133512* (2013.01)

(58) Field of Classification Search
    CPC .......... G02F 2001/134318; G02F 2001/13712; G02F 2001/13629; G02F 2001/133742; G02F 2201/121; G06F 3/0412; G06F 3/044; H01L 27/3279
    See application file for complete search history.

(56) References Cited

U.S. PATENT DOCUMENTS

| | | | |
|---|---|---|---|
| 2008/0284935 A1 | 11/2008 | Takahashi et al. | |
| 2009/0201455 A1* | 8/2009 | Murai | G02F 1/134363 349/139 |
| 2009/0322702 A1 | 12/2009 | Chien et al. | |
| 2011/0012115 A1* | 1/2011 | Jeon | G02F 1/13338 257/59 |
| 2012/0105337 A1 | 5/2012 | Jun et al. | |
| 2012/0127114 A1 | 5/2012 | Weaver et al. | |
| 2012/0249904 A1* | 10/2012 | Morosawa | H01L 27/1225 349/38 |
| 2012/0306797 A1* | 12/2012 | Misaki | G06F 3/0412 345/173 |
| 2013/0215067 A1 | 8/2013 | Hwang et al. | |
| 2013/0335365 A1* | 12/2013 | Kim | G06F 3/0412 345/174 |
| 2014/0152619 A1 | 6/2014 | Hotelling et al. | |
| 2015/0070611 A1 | 3/2015 | Shima et al. | |
| 2015/0219971 A1 | 8/2015 | Tanaka et al. | |
| 2016/0117023 A1 | 4/2016 | Hotelling et al. | |
| 2017/0014119 A1 | 1/2017 | Capote et al. | |

FOREIGN PATENT DOCUMENTS

| | | |
|---|---|---|
| JP | 2009-540375 A | 11/2009 |
| JP | 4816668 B2 | 11/2011 |
| JP | 2012-098687 A | 5/2012 |
| JP | 2013-540331 A | 10/2013 |
| KR | 20120040679 A | 4/2012 |
| KR | 20120045288 A | 5/2012 |
| WO | WO-2013/018736 A1 | 2/2013 |
| WO | WO 2013/089019 A1 | 6/2013 |
| WO | WO-2013/172216 A1 | 11/2013 |
| WO | WO-2014/024908 A1 | 2/2014 |

OTHER PUBLICATIONS

Office Action dated Apr. 18, 2017 in Japanese Patent Application No. 2016-082368.

Korean Office Action dated Dec. 19, 2017 in corresponding application No. 10-2016-7026309.

* cited by examiner

--Prior Art--

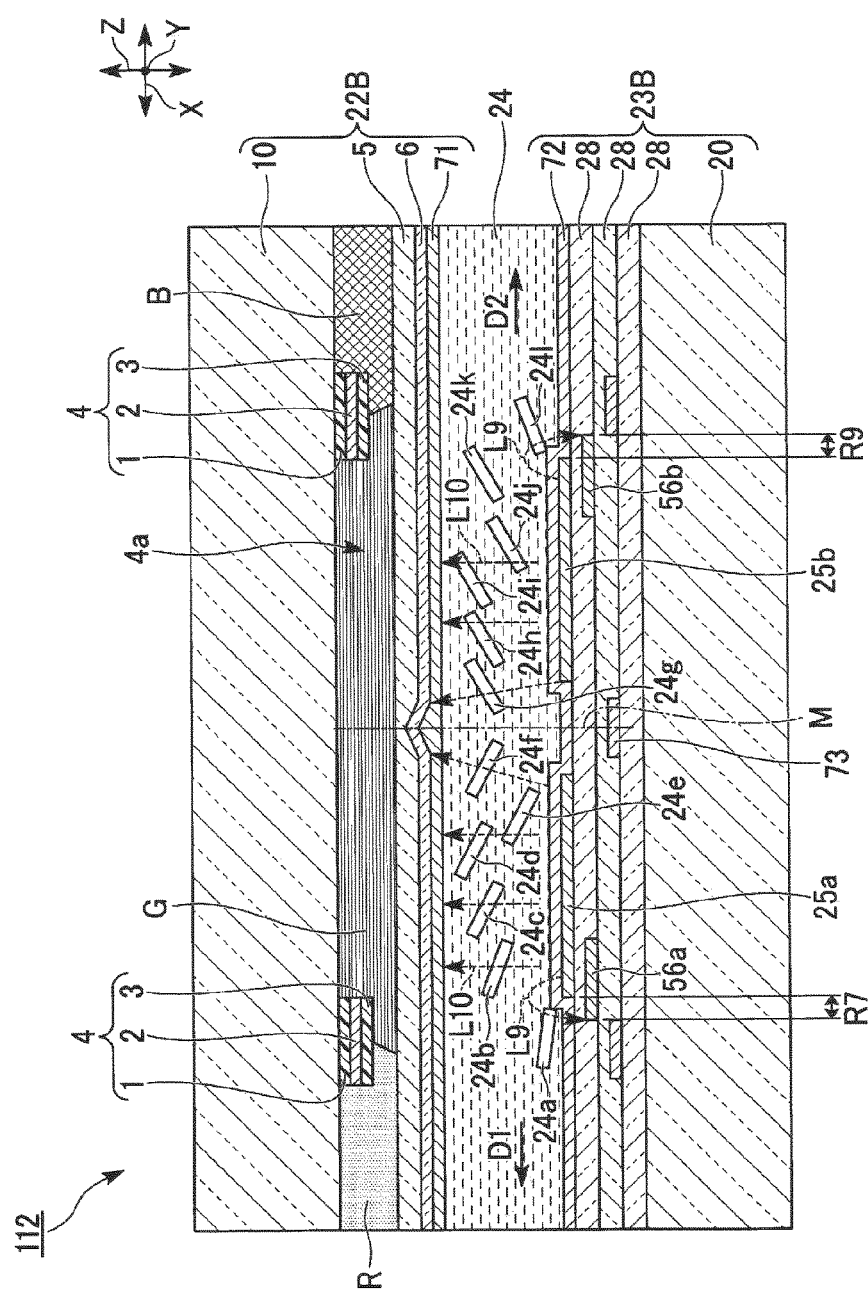

LIQUID CRYSTAL DISPLAY DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2014/063835 filed on May 26, 2014, which is based upon and claims the benefit of priority of Japanese Patent Application No. 2014-038822, filed on Feb. 28, 2014, the entire contents of them all are hereby incorporated by reference.

TECHNICAL FIELD

The present invention relates to a liquid crystal display device having a liquid crystal panel incorporating a touch sensing function, and having a higher aperture ratio and good visibility. The present invention can provide a liquid crystal display device equipped with a touch sensing electrode that uses a low-resistance metal layer pattern favorable for an electrode for use in touch sensing, and has higher light shielding properties of transmission light, the metal layer pattern exhibiting substantially black reflected color. In other words, the present invention relates to a so-called, in-cell liquid crystal display device incorporating a capacitive touch sensing function in a liquid crystal cell.

BACKGROUND

In recent years, liquid crystal display devices or organic EL display devices have been required to have a high aperture ratio to achieve bright display or low power consumption. To improve the contrast ratio of the display by dividing pixels, these display devices typically use a black matrix formed by carbon dispersion or the like as a black color material in a photosensitive resin.

(Light Shielding Properties of Black Matrix)

The black matrix, which is disposed dividing pixels to ensure display contrast, is typically formed on a transparent substrate such as glass using a black resin with a large thickness of 1 µm (micrometer) or more so as to obtain high light shielding properties. The black resin in this case is obtained by dispersing a color material such as carbon pigment in a resin. The black matrix in a frame portion on four sides of a display area where pixels are arranged in a matrix pattern, i.e. the frame-like black matrix, is particularly required to have high light shielding properties, i.e., high optical density of 5 or more, or 6 or more in transmission measurement. Light transmitted from a backlight unit is likely to leak from the frame portion, and therefore the black matrix in the frame portion is required to have a higher optical density than that of the black matrix formed on the display area.

(Forming Black Matrix with Thin Lines)

In display devices for small-size mobile devices, such as cellular phones, displays are being formed with increasingly higher definition such as 200 ppi (pixels per inch) or more, or 300 ppi or more. Accompanying this, black matrixes are required to have thinner lines, in addition to the need to have high light shielding properties. If black matrixes achieve high definition, the pixel width unavoidably becomes smaller than 30 µm. It has been revealed that a smaller thickness of the black matrixes adversely affects the flatness of the color filters. In a high-definition display device having 300 ppi or more, the black matrix needs to have a line width of 4 µm or less.

For example, since black matrixes have high light shielding properties, it is difficult to stably manufacture a pattern of black matrixes with a thin line having a width of 4 µm or smaller, by photolithography. If the black matrix has light shielding properties, sufficient light does not enter in a thickness direction of the black matrix at light exposure. Therefore, the thin film that forms a black matrix easily peels off in a process of development or the like.

Moreover, from the viewpoint of alignment, it is very difficult to form a black matrix with a thin line width of 4 µm or less through two-step photolithography processes, i.e. to form it with two layers, for the purpose of improving light resistance. Forming a black matrix through two-step photolithography processes tends to cause variation of line width or display unevenness, due to alignment errors.

In typically used processing steps of color filters and the like, since a plurality of screens are formed on a large-size transparent substrate, an alignment margin of ±2 µm, for example, is needed in general. Therefore, it has been difficult to form a black matrix by two-step photolithography processes.

(Touch Sensing Function in Display Device)

A method of enabling direct input to a liquid crystal display device or an organic EL display device is sought to be achieved, for example by attaching a capacitive touch panel to the display device, or providing elements suitable for touch sensing at portions of the display device, the portions being in contact with a liquid crystal layer, or the like. The method of providing elements suitable for touch sensing is called an in-cell method. For example, the in-cell method is based on electrostatic capacitance, or a technique of using an optical sensor.

The technique based on electrostatic capacitance is often applied to touch sensing based on the in-cell technique which enables the display device to acquire input using a pointer such as a finger or a stylus pen. This method based on electrostatic capacitance needs several two-set electrode groups for sensing electrostatic capacitance, as disclosed in PTLs 1 to 5.

CITATION LIST

Patent Literature

[PTL 1] JP-B-2653014
[PTL 2] JP-A-2009-540375
[PTL 3] JP-B-4816668
[PTL 4] WO 2013/089019A
[PTL 5] WO 2013/018736A

SUMMARY OF INVENTION

Technical Problem

PTLs 1 to 5 have problems as shown below.

PTL 1 discloses two sets of electrode groups that enable input of a spatial coordinate by utilizing capacitive coupling of metals such as Al (aluminum) or Cr (chromium), as disclosed in paragraphs [0018] and [0019].

However, the technique of PTL 1 has many defects. For example, paragraph [0019] describes that the two sets of light-shielding electrodes serve as a black matrix, and that a conductor having light shielding properties is made of metal such as of Al or Cr. However, these metals have high light reflectance, and hence reflected light is conspicuous in a bright room or outdoors where sun shines, and the quality of display is significantly deteriorated. PTL 1 fails to disclose a positional relationship of the two sets of electrodes, with a black layer pattern and a color filter, in a thickness direction of the display device. The pattern in this case uses a black color material and is applied to many display devices to obtain contrast in the display devices. Thus, PTL 1 fails to sufficiently describe color display that involves transmission and reflection.

Further, Al (aluminum) does not have alkali resistance, and thus is difficult, for example, to harmonize with the photolithographic process of forming red, green and blue pixels (the process includes using an alkaline developing solution).

More specifically, in a typically used color filtering process of alkali-developing a colored pattern such as of red pixels using a colored photosensitive resin, Al dissolves in the alkaline developing solution. Thus, Al is difficult to apply to the color filtering process. When Cr is concerned, if wet etching is adopted for pattern forming, there is a concern of environmental pollution caused by Cr ions. If dry etching is adopted, halogen gas used therein is a more dangerous risk.

PTL 2 proposes a configuration in which at least one touch element is disposed on a surface of a TFT plate, which is a first substrate, facing a second substrate, as recited, for example, in claims 1 to 3, 35, 45 and 60 of PTL 2. Claim 4 of PTL 2 recites a configuration in which a plurality of metal touch sensing electrodes are disposed on the back of a black matrix.

The gist of the technique of PTL 2 is recited to some extent in claims 1 to 3 of PTL 1. The technique of PTL 2 is important in that it explicitly shows a specific configuration of a touch element associated with touch sensing. Besides paragraph [0015] of PTL 1, there is a description that an electrode means for use as stylus input through charge detection also serves as a component of an AMLCD (active matrix liquid crystal display).

However, the technique of PTL 2 fails to consider optimization of the liquid crystal display device, and particularly fails to consider transmittance. Moreover, PTL 2 fails to sufficiently consider a technique relating to noise reduction in touch sensing, or to improve visibility when the liquid crystal display device is viewed from an observer.

In addition, regarding the plurality of metal touch sensitive electrodes disposed on the back of the black matrix, there is no detailed description of the black matrix pattern and a pattern of the plurality of metal touch sensitive electrodes. It can be understood from FIG. 57 or 72 of PTL 2 that there is a difference in size between the black matrix pattern and the pattern of a metal or the like shown by reference sign M1. PTL 2 fails to disclose a technique of forming the black matrix pattern and the pattern of the metal or the like, with the same line width. For example, there is no specific description of achieving a high definition with pixels of 300 ppi or more.

PTL 2 is almost silent about a method of holding an electrostatic capacitance across the pattern such as of a metal shown by reference sign M1 and a counter electrode made of $ITO_2$ or the like used for touch sensing, and specific measures for noise reduction or improvement of S/N ratio in touch sensing. Further, although light reflection from an ITO or a metal BM is incident on an observer's eye in a configuration shown in FIG. 36, for example, PTL 2 fails to consider a technique of improving visibility, with which reflectance of the black matrix shown in FIG. 57 is decreased to realize low reflectance. PTL 2 also fails to consider light reflected from the liquid crystal shown by reference sign M1 in FIG. 57 (retroreflection in a liquid crystal cell).

The technique of PTL 2 is not sufficient from the viewpoint of transmittance required for serving as a liquid crystal display device, as well as the viewpoint of visibility for an observer and noise reduction or an S/N ratio in touch sensing.

PTL 3 discloses a technique of using a driving voltage for display, applied to a common electrode disposed in the vicinity of a liquid crystal layer in a liquid crystal display device, as a driving signal for a touch sensor. As disclosed in FIGS. 4, 5, 7, and 8 of PTL 3, the common electrode is disposed at a position farther from a pointer such as a finger than a detection electrode is, and a driving signal (a driving electrode) is applied to the common electrode.

PTL 3 fails to disclose a configuration in which an electrode disposed at a position closer to a pointer such as a finger is used as a driving electrode associated with touch sensing. Further, PTL 3 also fails to disclose a technique of configuring the driving electrode used for touch sensing, by laminating a light absorptive resin layer and a copper alloy in this order from a position closer to the observer. The technique of PTL 3 is not optimized from the viewpoint of transmittance needed when serving as a liquid crystal display device, as well as the viewpoint of visibility for the observer and noise reduction or an S/N ratio in touch sensing.

PTL 4, as recited in claim 1 thereof, discloses a capacitive touch panel substrate, in which an electrostatic capacitance is generated by adjacently disposed first and second unit electrodes which are flush with each other. For example, (a) and (b) of FIG. 3 of PTL 4 disclose a configuration in which a conductive layer 7 is laminated on an insulating light-shielding layer 6.

Further, PTL 4 discloses that the substrate includes a portion where the insulating light-shielding layer 6 is not formed, as shown in FIG. 1 that is a cross section taken along the line A-A' of FIG. 3 (a), and a portion where the conductive layer 7 is formed on the insulating light-shielding layer 6, as shown in FIG. 2 that is a cross section taken along the line B-B' of FIG. 3 (a).

In FIG. 2 of PTL 4, the insulating light-shielding layer 6 has a large width, and hence causes a problem of a decrease in aperture ratio of pixel openings. In contrast, in FIG. 1, the conductive layer 7 is visually recognized via a transparent insulating substrate, and hence light reflected from the conductive layer 7 enters an observer's eye, causing a problem of significantly decreasing visibility. As described in paragraph [0071] of PTL 4, the conductive layer 7 plays a role of establishing an electrical connection, via a contact hole, with a position detection electrode 9 that transmits visible light therethrough, but does not play a role of performing capacitive detection.

PTL 4 fails to disclose a configuration in which a sensing electrode, which is the position detection electrode 9, and a drive electrode are laminated being perpendicular to each other on a surface of the transparent insulating substrate contacting a liquid crystal, via an insulating layer such as a transparent resin layer, for example. In addition, PTL 4 fails to disclose a technique of forming the insulating light-shielding layer 6 and the conductive layer 7 into the same shape and dimension in plan view.

The technique disclosed in PTL 4 has a problem that the configuration is extremely complicated, including formation of the contact hole. From the viewpoint of an aperture ratio as well, it cannot be said that PTL 4 proposes a touch panel substrate having good visibility.

PTL 5 discloses a display device that uses an oxide layer which contains an element selected from In, Ga, and Zn as a semiconductor layer of an active element, and includes one frame period consisting of a first period in which image data is written, and a second period in which positional detection of an object to be detected is sensed. In a position detecting portion, a plurality of first electrodes are provided so as to intersect with a plurality of second electrodes. As shown in FIG. 4 or 24 of PTL 5, the plurality of first and second electrodes are adjacent to each other respectively in plan view, and are capacitively coupled, at their adjacent sites as recited in claim 3 of PTL 5.

FIG. 2 shows a pixel arrangement in a TFT substrate relating to the technique of PTL 5, in which pixels are arranged in a horizontal direction and a vertical direction in plan view. FIGS. 4 and 24 disclose the first and second electrodes which are divided by slits in a rhombus pattern and arrayed in a direction of about 45 degrees.

In the technique in PTL 5, the shape of the pixel electrodes, and the state of positional alignment of the rhombus-shaped first and second electrodes in plan view are unclear. Further, there is no disclosure of an optimal liquid crystal when the first and second electrodes, which are defined by slits and arrayed in a direction of about 45 degrees, are used as common electrodes Com. When a vertically-aligned liquid crystal is assumed, the slits in the direction of about 45 degrees are considered to adversely affect the liquid crystal alignment or transmittance of the liquid crystal, for example. As shown in paragraphs [0143] and [0144] or FIG. 13 of PTL 5, a conductive layer 27 and a bridge electrode 7 are formed of the same metal layer. However, PTL 5 fails to disclose a technique of configuring either the first electrode or the second electrode with two layers made up of a metal layer and a black matrix. For example, PTL 5 fails to disclose a driving electrode for touch sensing in which a light absorptive resin layer pattern and a metal layer pattern having the same shape and dimension are laminated with each other.

In view of the circumstances as described above, it is desired that a liquid crystal display device having a touch sensing function has performance as described below, for example. Specifically, in order to reduce noise during a touch sensing operation of a pointer such as a finger or a stylus pen, it is desired that the plurality of capacitive two-set electrode groups described above have a low resistance. In particular, the plurality of electrode groups are required to be located at a position nearer to the pointer such as a finger, and the driving electrode used for touch sensing (i.e., the scanning electrode) is required to have a low resistance, so as to prevent waveform of driving voltage from being rounded. Moreover, it is desirable that a detection electrode perpendicular to the driving electrode also has a low resistance.

A surface of the plurality of electrode groups applied to the display device needs to have low reflectance. If the plurality of electrode groups have high light reflectance (have reflectance which is not low), when bright daylight such as sunlight is incident on the display area of the display device, display quality is significantly deteriorated. For example, when one set of electrode groups is formed of a single layer of aluminum or chromium, or has a two-layer structure formed of these metals and chromium oxide, external light reflectance becomes large, causing deterioration in display visibility. To decrease retroreflected light from a backlight unit provided to the back surface of an array substrate of the liquid crystal display device, the surface of each of the plurality of electrode groups desirably has low reflectance.

In a configuration of the embodiments of the present invention described below, transmittance of liquid crystal display is enhanced by using a driving electrode having a higher aperture ratio, a detection electrode (transparent electrode) ensuring transmittance, and a vertically-aligned liquid crystal layer driven by a longitudinal electric field, throughout the thickness of the display.

The present invention has been made in view of the above-described problems, and has a first object of providing a liquid crystal display device having an improved aperture ratio, with a touch sensing function being incorporated, and having a low-resistance driving electrode of a black appearance, with good visibility and higher transmittance (aperture ratio).

The present invention has a second object of providing a liquid crystal display device having improved or even high performance in detecting a position of a pointer such as a finger, with a simple configuration and high accuracy.

Solution to Problem

To try to solve the above-described issues, the present invention proposes a means below.

A liquid crystal display device in one aspect of the present invention includes: a display unit that has a display substrate, a liquid crystal layer, and an array substrate laminated therein in this order; and a control unit that controls the display unit and a touch sensing function, wherein the display substrate has a first transparent substrate, and has a plurality of first light absorptive resin layer patterns having openings formed therein, a plurality of metal layer patterns having openings formed therein, a plurality of second light absorptive resin layer patterns having openings formed therein, a transparent resin layer, and a plurality of transparent electrode patterns that are electrically isolated, laminated in this order on a surface of the first transparent substrate, the surface of the first transparent substrate facing the liquid crystal layer, the plurality of first light absorptive resin layer patterns, the plurality of metal layer patterns, and the plurality of second light absorptive resin layer patterns are formed into the same shape and are in alignment, when viewed in a laminating direction along which the display substrate, the liquid crystal layer, and the array substrate are laminated, the plurality of metal layer patterns are arrayed in a first direction perpendicular to the laminating direction, being insulated from each other, the plurality of transparent electrode patterns are arrayed in a second direction perpendicular to the laminating direction and the first direction, being insulated from each other, each metal layer pattern has at least one of an alloy layer mainly containing copper, and a copper layer, the array substrate has a second transparent substrate, and has a pixel electrode, a thin film transistor, a metal wiring, and a plurality of insulating layers provided on a surface of the second transparent substrate, the surface of the second transparent substrate facing the liquid crystal layer, the touch sensing function at least includes setting the plurality of the transparent electrode patterns to a constant electrical potential, applying a touch driving voltage across the plurality of transparent electrode patterns and the plurality of metal layer patterns, and detecting a change in electrostatic capacitance across the metal layer patterns and the transparent electrode patterns, and in driving the liquid crystal layer, the plurality of transparent electrode patterns are set to a constant electrical potential, a liquid crystal driving voltage is applied across the plurality of transparent electrode patterns and the pixel electrode to drive the liquid crystal layer, and a frequency of the touch driving voltage is different from that of the liquid crystal driving voltage.

In the liquid crystal display device in one aspect of the present invention, it is preferable that the array substrate includes the pixel electrode, and an auxiliary capacitance electrode disposed on an opposite side to the liquid crystal layer via the insulating layers contacting the pixel electrode, each auxiliary capacitance electrode forms, in plan view, an overlap with the pixel electrode and an extension of the auxiliary capacitance electrode, the extension being extended from the pixel electrode, the overlaps as well as the extensions are line-symmetrically disposed with respect to a center line dividing the opening into two, and a voltage different from the liquid crystal driving voltage is applied to each auxiliary capacitance electrode.

In the liquid crystal display device in one aspect of the present invention, it is preferable that the thin film transistor includes a channel layer that contains two or more metal oxides among gallium, indium, zinc, tin, and germanium.

In the liquid crystal display device in one aspect of the present invention, it is preferable that each metal layer pattern is configured of a plurality of layers, and at least one of the plurality of layers is the alloy layer.

In the liquid crystal display device in one aspect of the present invention, it is preferable that each metal layer pattern has the alloy layer, and an alloy element contained in the alloy layer is one or more elements selected from magnesium, calcium, titanium, molybdenum, indium, tin, zinc, aluminum, beryllium, and nickel.

In the liquid crystal display device in one aspect of the present invention, it is preferable that each metal layer pattern is configured of a plurality of layers, and among the plurality of layers, the layer nearest to the second transparent substrate is a copper-indium alloy layer.

In the liquid crystal display device in one aspect of the present invention, it is preferable that auxiliary conductors having resistivity smaller than resistivity of the plurality of transparent electrode patterns are provided on the transparent electrode patterns.

In the liquid crystal display device in one aspect of the present invention, it is preferable that the openings of the first light absorptive resin layer patterns, the openings of the metal layer patterns, and the openings of the second light absorptive resin layer patterns are each provided with any of a red pixel formed of a red layer, a green pixel formed of a green layer, and a blue pixel formed of a blue layer, and the red pixel, the green pixel, and the blue pixel are inserted between the plurality of metal layer patterns and the transparent resin layer in the laminating direction, and are arranged adjacently to each other when viewed in the laminating direction.

In the liquid crystal display device in one aspect of the present invention, it is preferable that liquid crystal molecules contained in the liquid crystal layer exhibit negative dielectric anisotropy and are initially aligned in a vertical direction.

The electrodes associated with touch sensing, together with the detection electrode and the driving electrode, are hereinafter collectively referred to as a touch electrode.

As described in detail below, the driving electrode has a three-layer configuration including the first light absorptive resin layer, the metal layer, and the second light absorptive resin layer. In the description below, a driving electrode having the three-layer configuration may also be referred to as a black electrode, and a pattern of the black electrode may also be referred to as a black pattern.

Advantageous Effects of the Invention

One aspect of the present invention can increase an aperture ratio to thereby provide a liquid crystal display device that has improved transmittance and improved visibility, for example. Moreover, according to one aspect of the present invention, it is possible to provide a liquid crystal display device equipped with a black electrode that has an improved or even high performance in detecting a position of the pointer such as a finger, and has a smaller resistance value and lower reflectance, for example.

In one aspect of the present invention, the metal layer pattern is provided thereon with the second light absorptive resin layer pattern. Provision of the second light absorptive resin layer can prevent retroreflection of light in the liquid crystal cell. For example, if a plurality of metal wirings (including a source line, a gate line, and the like) in the second transparent substrate of the array substrate are made of copper or aluminum, retroreflection or diffused reflection of light between the metal layer patterns disposed in the first transparent substrate can be prevented. If the thin film transistor is sensitive to light, retroreflected light can be prevented from being incident on thin film transistor.

In addition, one aspect of the present invention proposes a touch electrode flexibly adaptable up to a pixel size that is better suited to achieve a higher definition. This touch electrode, in contrast to an externally-added touch panel, can support stylus input.

BRIEF DESCRIPTION OF THE DRAWINGS

FIG. 19 is a cross-sectional view illustrating effects of the display unit, according to the fourth embodiment of the present invention.

DESCRIPTION OF REPRESENTATIVE EMBODIMENTS

With reference to the drawings, hereinafter will be described some embodiments of the present invention. In the description below, identical or substantially identical functions and components are designated with the same reference signs to omit duplicate description or provide description only when needed. The embodiments described herein are representative of the invention, and the invention is not limited to these representative embodiments.

In each of the embodiments, characteristic portions will be described, omitting description, for example, of portions having no difference from the components of typically used display devices. In each of the embodiments, a liquid crystal display device will be described as a main example. However, as is occasionally described in the embodiments, the present invention can be similarly applied to other display devices such as organic EL display devices.

First Embodiment

With reference to FIGS. 1 to 13, a first embodiment of a liquid crystal display device according to the present invention will be described. The scale ratio of thicknesses or dimension of components is varied between the drawings as appropriate for the sake of clarity.

Figure 1:
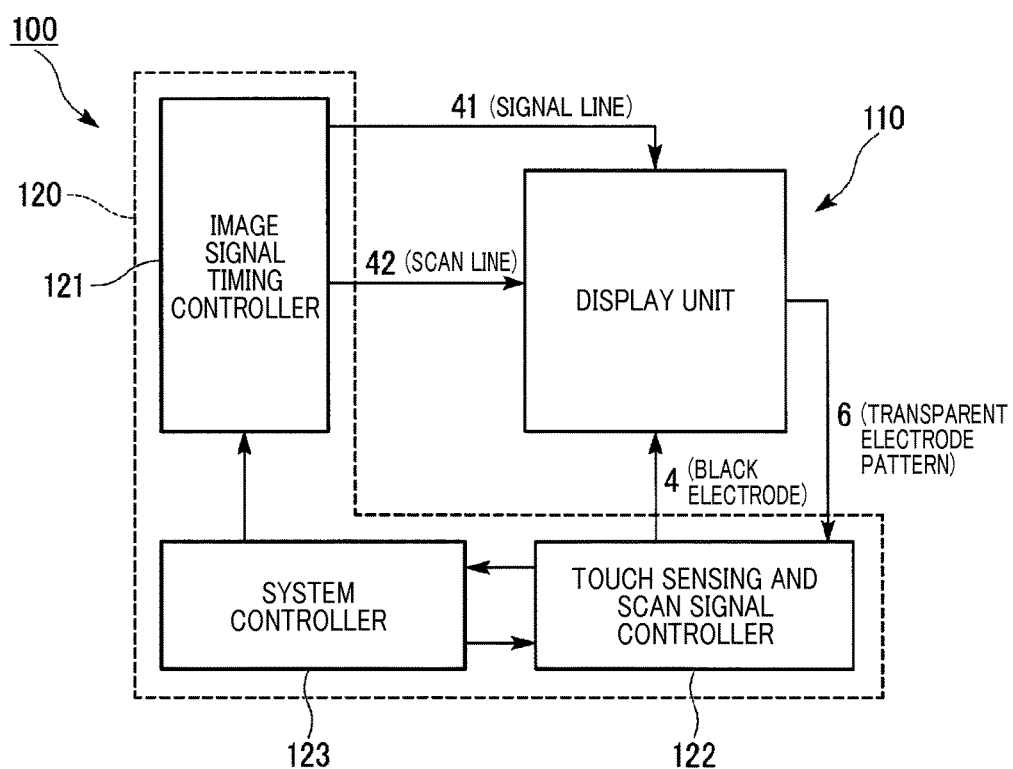
FIG. 1 is a block diagram illustrating a liquid crystal display device, according to a first embodiment of the present invention.

As shown in FIG. 1, a liquid crystal display device 100 of the present embodiment includes a display unit 110, and a control unit 120 for controlling the display unit 110 and a touch sensing function.

Figure 2:
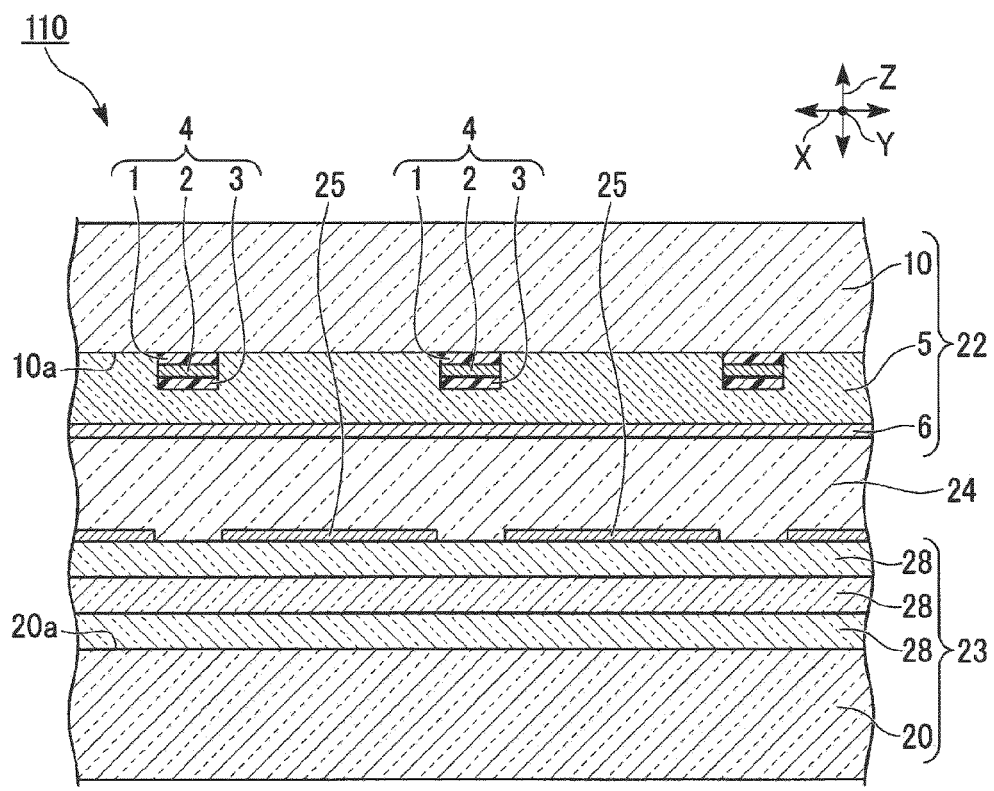
FIG. 2 is a side cross-sectional view illustrating a display unit of the liquid crystal display device, according to the first embodiment of the present invention.

As shown in FIG. 2, the display unit 110 has a configuration in which a liquid crystal display device substrate 22 (display substrate), a liquid crystal layer 24, and an array substrate 23 are laminated in this order. The display unit 110 performs a display operation in a normally-black mode. Specifically, the display unit 110 is configured by bonding a first transparent substrate 10 of the liquid crystal display device substrate 22, which will be described below, and a second transparent substrate 20 of the array substrate 23, which will be described below, such that they face each other via the liquid crystal layer 24.

The term "face each other" refers to that a surface of the transparent substrate 10 where a touch electrode such as a metal layer pattern 2, which will be described below, is formed, faces a surface of the transparent substrate 20 each other where a functional element such as a pixel electrode 25 or a thin film transistor 45, which will be described below, is formed. The direction along which the liquid crystal display device substrate 22, the liquid crystal layer 24, and the array substrate 23 are laminated is defined as a laminating direction Z (vertical direction).

(Schematic Configuration of Liquid Crystal Display Device Substrate)

The liquid crystal display device substrate 22 has a configuration in which a plurality of first light absorptive resin layer patterns 1, a plurality of metal layer patterns 2, a plurality of second light absorptive resin layer patterns 3, a transparent resin layer 5, and a plurality of transparent electrode patterns 6 are laminated in this order on a main surface (surface) 10a of the first transparent substrate 10, the main surface facing the liquid crystal layer 24. As mentioned above, the light absorptive resin layer patterns 1 and 3, and the metal layer pattern 2 sandwiched by the light absorptive resin layer patterns 1 and 3 configure a black electrode 4.

A glass substrate is used, for example, as the first transparent substrate 10.

Figure 3:
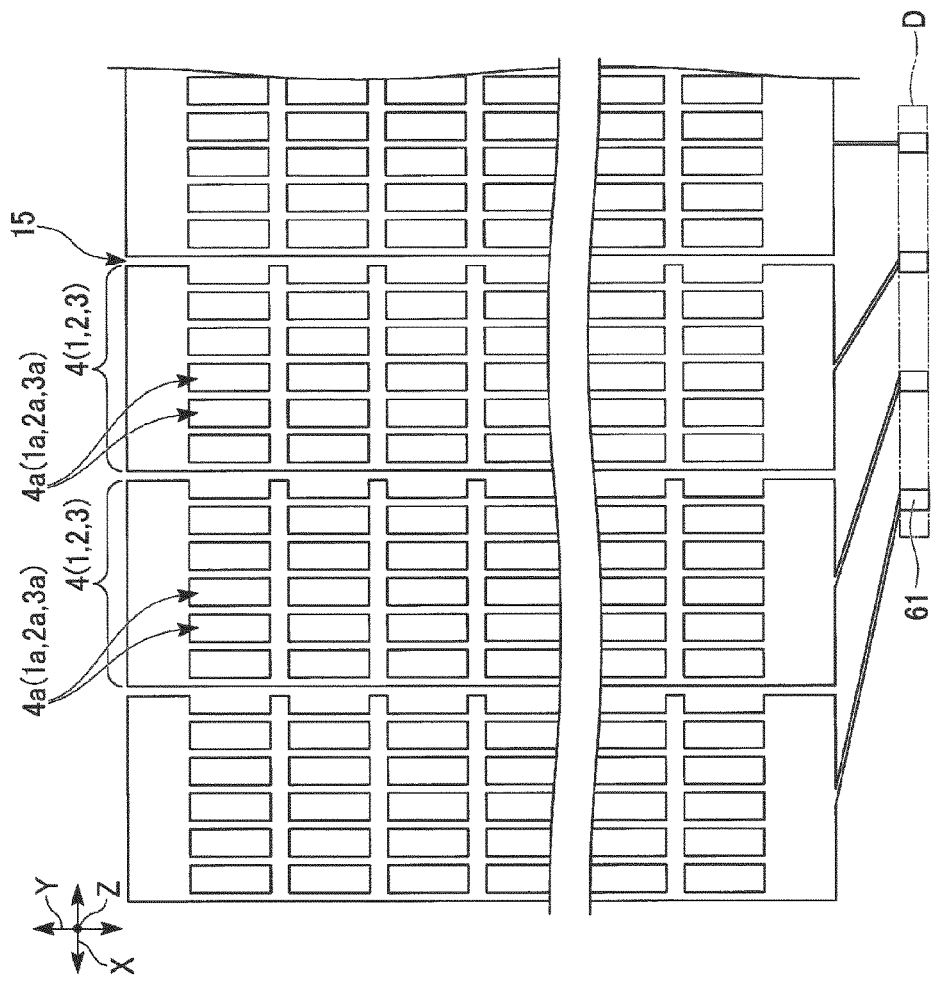
FIG. 3 is a plan view illustrating black electrodes of the liquid crystal display device, according to the first embodiment of the present invention.

As shown in FIG. 3, when viewed parallel to the laminating direction Z (in plan view), the plurality of first light absorptive resin layer patterns 1, the plurality of metal layer patterns 2, and the plurality of second light absorptive resin layer patterns 3 are formed into the same shape and completely aligned.

Specifically, the dimension is the same between the plurality of first light absorptive resin layer patterns 1, the plurality of metal layer patterns 2, and the plurality of second light absorptive resin layer patterns 3.

The shape is the same between the plurality of first light absorptive resin layer patterns 1, the plurality of metal layer patterns 2, the plurality of second light absorptive resin layer patterns 3, and the plurality of black electrodes 4 obtained by laminating the plurality of first light absorptive resin layer patterns 1, the plurality of metal layer patterns 2, and the plurality of second light absorptive resin layer patterns 3. Accordingly, the following description is provided centering on the configuration of the plurality of metal layer patterns 2.

(Metal Layer Pattern)

In one metal layer pattern 2, six pixel openings (openings) 2a are arranged in a first direction X perpendicular to the laminating direction Z, and 480 pixel openings 2a, for example, are arranged in a second direction Y perpendicular to the laminating direction Z and the first direction X. The first and second directions X and Y are parallel to the main surface 10a of the first transparent substrate 10. The plurality of metal layer patterns 2 are arranged in the first direction X, being electrically insulated from each other. The metal layer patterns 2 are extended in the second direction Y.

For example, a pixel opening 2a can be made into a polygonal shape, including at least two parallel sides, As the polygonal shape having two parallel sides, a rectangle, a hexagon, a V-shape (doglegged shape), and the like can be mentioned. As the shape of a frame surrounding these polygonal pixels, an electrically-closed shape can be used. Sensitivity of electrical noise propagated from periphery of the liquid crystal display device depends on whether the pattern shape is electrically closed or partially open (include portions which appear to be discontinuous) in plan view. Alternatively, Sensitivity of electrical noise propagated from periphery of the liquid crystal display device depends on the pattern shape or the area of the metal layer patterns 2.

Each metal layer pattern 2 includes at least one of an alloy layer mainly containing copper, and a copper layer. The alloy layer mainly containing copper refers to an alloy layer that contains more than 50% by weight of copper. The copper layer refers to a layer formed of pure copper.

When the metal layer pattern 2 is formed of a thin film of an alloy layer, and if the film thickness (thickness, i.e., the length in the laminating direction Z) is 100 nm (nanometers) or more, or 150 nm or more, the metal layer pattern 2 hardly transmits visible light therethrough. Accordingly, if the thickness of the metal layer pattern 2 according to the present embodiment is in the range of approximately 100 nm to 200 nm, for example, sufficient light resistance can be obtained. As will be described below, a part of the metal layer pattern 2 can be formed in the laminating direction Z being formed as a metal layer containing oxygen.

Each metal layer pattern 2 may be configured of a plurality of layers. In this case, at least one of the plurality of layers is an alloy layer. It should be noted that each metal layer pattern 2 may be configured of a single layer.

If each metal layer pattern 2 has an alloy layer, alloy elements contained in the alloy layer in addition to copper are preferably one or more selected from magnesium, calcium, titanium, molybdenum, indium, tin, zinc, aluminum, beryllium, and nickel. With such a configuration, adhesiveness between the metal layer patterns 2 and a glass substrate or a resin (e.g., the light absorptive resin layers) can be enhanced. Copper is a conductor having good alkali resistance and small electrical resistance, but can be insufficient when adhesiveness to glass or a resin is concerned. By alloying copper to form an alloy layer mainly containing copper, adhesiveness between the metal layer patterns 2 and a glass substrate or a resin can be improved.

The amount of alloy elements added to copper in the alloy layer is preferably 3 at % or less, because this amount can prevent significant increase of the resistance of the alloy layer. If the amount of alloy elements added to copper is 0.2 at % or more, adhesiveness between the thin alloy layer and a glass substrate or the like is improved. Unless otherwise specified in the description below, the metal forming the metal layer patterns 2 in the embodiments below, as well as in the present embodiment, is an alloy layer containing 1 at % magnesium (the rest of the metal is copper). The resistance of the alloy layer containing 1 at % magnesium does not significantly differ from the resistance of a layer made of only copper.

The alloy layer can be formed by vacuum deposition using sputtering, for example. The alloy elements may be added to copper so as to generate a concentration gradient in the laminating direction Z of the alloy layer. A center portion of the alloy layer in the laminating direction Z may contain 99.8 at % or more copper. The concentration gradient may be generated such that, in the laminating direction Z of the metal layer pattern 2, the amount of alloy elements on a surface contacting the first light absorptive resin layer pattern 1, or on a surface opposite to the surface contacting the first light absorptive resin layer pattern 1 (surface contacting the second light absorptive resin layer pattern 3), is larger than the amount of the alloy elements in the center portion of the metal layer pattern 2 in the laminating direction Z.

In the process of forming the alloy layer, oxygen may be introduced to provide the layer as an oxygen-containing layer. Specifically, oxygen may be introduced into a contact layer which ranges, for example, from the surface of the alloy layer contacting the first light absorptive resin layer pattern 1, as a starting point, to a point of 2 nm to 20 nm in the laminating direction Z. The amount of oxygen introduced during the forming process can be 10%, for example, relative to the amount of a base gas, such as argon, to be introduced. By containing 5 at % or more oxygen, for example, the contact layer, being included in the metal layer pattern 2, can improve adhesiveness of the metal layer pattern 2.

When the oxygen content in the base gas is 15 at % or more, adhesiveness may not be improved. The total thickness of the metal layer pattern 2 including the contact layer of the alloy layer can be in the range of 102 nm to 320 nm, for example. By forming the oxygen-containing contact layer on the surface of the metal layer pattern 2, reflectance of the metal layer pattern 2 can be decreased, and low reflection effects exerted as the black electrode 4 can be enhanced.

It should be noted that nickel, in the form of a copper-nickel alloy containing 4 at % or more nickel, can be applied to the embodiments of the present invention. For example, a copper-nickel alloy containing 4 at % or more nickel is formed, first, with a thickness in the range of 5 nm to 20 nm, with 5 at % or more oxygen being contained therein by design. Further, a copper-nickel alloy containing substantially no oxygen is laminated with a thickness in the range of approximately 100 nm to 300 nm to thereby form an electrode for touch sensing having a reflectance of 30% or less.

By allowing the copper-nickel alloy to contain 5 at % or more oxygen, the light reflected from the surface of the copper-nickel alloy becomes black. By providing the first light absorptive resin layer pattern 1 to a boundary surface between the first transparent substrate 10 and the metal layer pattern 2 made of the copper-nickel alloy, reflectance of the black electrode 4 can be reduced to 2% or less.

In the liquid crystal display device substrate 22, when viewed from the display area's side, i.e. from the first transparent substrate 10, the black electrodes 4 serves as a low-reflection black matrix.

In the configuration of the embodiment of the present invention, the metal layer patterns 2 are formed into a frame shape dividing individual pixels, or into a matrix pattern, using a thin line. Therefore, the electrostatic capacitance (fringe capacitance, see FIG. 12) at an edge of each metal layer pattern 2 can be increased. In this case, the transparent electrode patterns 6 each being formed in a large-width stripe shape and perpendicular to the metal layer patterns 2 can have a constant electrical potential. The constant electrical potential includes 0 (zero) volt, an electrical potential when the transparent electrode patterns 6 are grounded via a resistor having high resistance, or a constant electrical potential being offset in either a positive or a negative side. A detection driving voltage of a rectangular wave or an alternating voltage is applied between the transparent electrode patterns 6, which are at a constant electrical potential, and the metal layer patterns 2, to detect a fringe capacitance (change in fringe capacitance) per metal layer pattern 2. As shown in a schematic diagram of FIG. 13, with a touch by a pointer P such as a finger, the produced fringe capacitance (electrostatic capacitance produced at the fringe portion) is significantly decreased. In other words, by subtracting the electrostatic capacitance after the touch by a finger or the like, from the electrostatic capacitance before the touch (detecting a change), a large difference in fringe capacitance (change in electrostatic capacitance) can be obtained to improve and even significantly improve the S/N ratio in touch sensing. In the present invention, the change in the detected fringe capacitance is larger, and hence the driving voltage can be set to a small value, for example, to make the influence of a stray capacitance smaller than when the driving voltage is set to a large value.

When applying offset to an alternating voltage or a voltage of a rectangular wave (bias voltage is applied), the constant electrical potential can be set to a median voltage of the alternating voltage or the like. The constant electrical potential is thus not limited to 0 (zero) volt. By setting the driving voltage to a small value, power consumption can be reduced.

For example, two types of metal layer patterns 2 (black electrodes 4) can be used to calculate (carry out subtraction for) an electrostatic capacitance in touch sensing, for noise compensation. For example, the two types of metal layer patterns 2 are obtained by providing different fringe lengths, with the areas thereof being made equal. By obtaining a difference in fringe capacitance across the two types of the metal layer patterns 2 by subtraction, noise produced at the metal layer patterns 2 can be cancelled. The area of each metal layer pattern 2 can be adjusted by designing the shape of a bezel portion (frame portion) outside the display unit or the like, for example. The size and shape of each metal layer pattern 2 can be adjusted to reduce the influence of an interference noise entering the liquid crystal display device from outside (hereinafter referred to as external noise). A part of the metal layer patterns 2 may be open (may include portions discontinuous in plan view). The driving frequency for touch sensing is preferably different from an average frequency of the main external noise.

Figure 11:
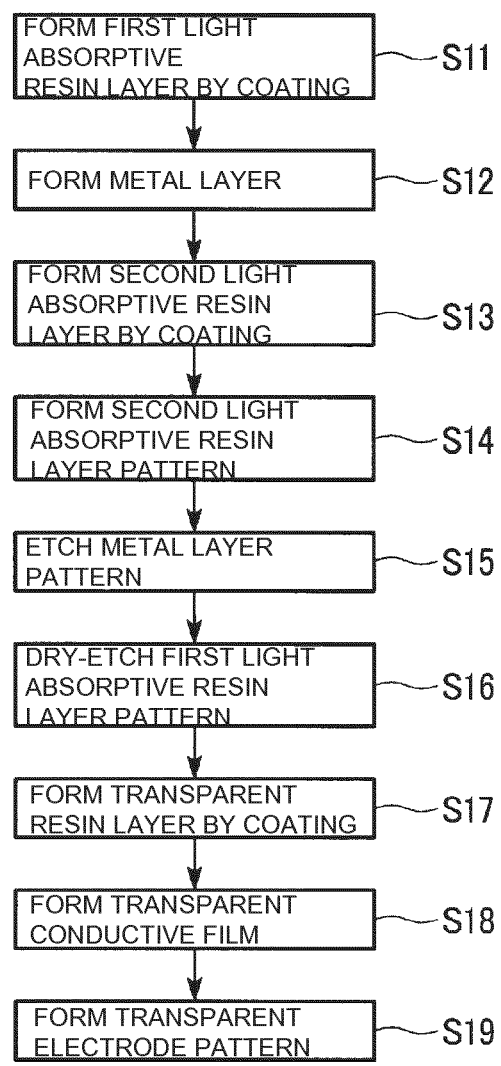
FIG. 11 is a flowchart illustrating a method of manufacturing a substrate for the liquid crystal display device, according to the first embodiment of the present invention.

For example, in contrast to the embodiment of the present invention, in the structure of the two sets of touch electrodes which are adjacently flush with each other as shown in FIG. 11 of PTL 4 mentioned above, it is difficult to obtain a large difference in fringe capacitance or a change in electrostatic capacitance before and after touch sensing, and is also difficult to use stylus input for high definition pixels.

As shown in FIG. 3, each metal layer pattern 2 is defined, for example, to include six pixel openings 2a as a unit in the first direction X. The metal layer patterns 2 are arranged in the first direction X, by patterning, so as to be electrically insulated from each other, i.e. electrically independent of each other. A spacing 15 that is a gap is formed between the metal layer patterns 2 adjacent in the first direction X.

An array of 320 metal layer patterns 2 in the first direction X, for example, can provide 1920×480 pixels on the liquid crystal display device substrate 22. The pixel unit to be divided can be adjusted in conformity with the accuracy of touch sensing or the purpose of use.

Each metal layer pattern 2 can be used as a detection electrode that detects a change in electrostatic capacitance generated in touch sensing, or a driving electrode of touch sensing (touch driving electrode). The following description will be focused on the case where the metal layer pattern 2 is mainly used as a driving electrode.

The plurality of first light absorptive resin layer patterns 1, the plurality of second light absorptive resin layer patterns 3, and the plurality of black electrodes 4 also have pixel openings (openings) 1a, pixel openings (openings) 3a, and pixel openings 4a formed therein, respectively, as in the metal layer patterns 2. The spacing 15 is formed between the first light absorptive resin layer patterns 1, between the second light absorptive resin layer patterns 3, and between the black electrodes 4, adjacent in the first direction X. The first light absorptive resin layer patterns 1, the second light absorptive resin layer patterns 3, and the black electrodes 4, adjacent in the first direction X, are electrically insulated from each other.

In the pixel openings 4a, the pixel openings 1a, the pixel openings 2a, and the pixel openings 3a are aligned in the laminating direction Z.

As shown in FIG. 2, the plurality of black electrodes 4 are disposed at a boundary surface between the first transparent substrate 10 and the transparent resin layer 5.

(Light Absorptive Resin Layer Pattern)

The first light absorptive resin layer patterns 1 and the second light absorptive resin layer patterns 3 are electrical insulators, for example. Main light absorptive black color materials that can be contained in the light absorptive resin layer patterns 1 and 3 include carbon, carbon nanotubes (hereinafter referred to as CNT), metal particulates, and the like. The concentration of carbon or CNT may be varied in the thickness direction of the first light absorptive resin layer pattern 1. Each first light absorptive resin layer pattern 1 may have a two-layer configuration including a light absorbing resin layer that contains carbon as a main light absorbing material, and a light absorptive resin layer that contains CNT as a main light absorbing material. Various organic pigments may be added to the black color material to adjust color. Using carbon as a "main light absorbing material" refers to that the content of carbon relative to the pigments in the black color material is 51% or more by weight ratio. The first light absorptive resin layer pattern 1 better prevents light from being reflected to the observer. The observer's eye visually recognizes the first light absorptive resin layer pattern 1 as black.

The optical density of the first light absorptive resin layer pattern 1 in transmission measurement can be less than 2, for example. For example, it is preferable that the optical density of the first light absorptive resin layer pattern 1 per 1 μm thickness in transmission measurement is in the range of 0.4 to 1.8, inclusive, and the thickness of the first light absorptive resin layer pattern 1 is in the range of 0.1 μm to 0.8 μm, inclusive. The optical density and the thickness can be set, as needed, to values outside the numerical ranges mentioned above. However, the amount of carbon per 1 μm thickness of the first light absorptive resin layer pattern 1 is preferably adjusted such that the light reflectance at the boundary surface between the first transparent substrate 10 and the light absorptive resin layer pattern 1 is less than 2%.

If the light reflectance at the boundary surface exceeds 2%, the black color on a display screen of the normally-black liquid crystal display device becomes more visually different from the color of the frame (bezel) (usually black). From a design viewpoint, the color of the black color material or the amount of carbon is desirably adjusted such that the light reflectance at the boundary surface between the first transparent substrate 10 and the first light absorptive resin layer pattern 1 is less than 2%. Further, the concentration of the black color material may be varied in the thickness direction of the light absorptive resin layer, or the light absorptive resin layer may be formed of a plurality of layers with different concentrations of the black color material. Further, the light absorptive resin layer may be formed of a plurality of layers made of resins having different refractive indices. It is desirable that the resins used for the light absorptive resin layer have a low refractive index.

The optical density or the hue of the first light absorptive resin layer pattern 1 can be adjusted by the amount of the black color material, such as carbon, or the amount of several organic pigments added to carbon. By decreasing the amount of carbon contained in the first light absorptive resin layer pattern 1 within a range of not increasing light reflected from the metal layer pattern 2, reflected light at the boundary surface between the first transparent substrate 10 and the first light absorptive resin layer pattern 1 can be decreased, and thus visibility is improved.

For example, the second light absorptive resin layer patterns 3 can be obtained by applying a photosensitive black coating liquid onto the first transparent substrate 10 where the metal layer has been formed, for exposure and development with a desired pattern, followed by heat treatment or the like for curing. The thickness of the second light absorptive resin layer patterns 3 when coated is a little larger than a target thickness, considering in advance a film loss due to dry etching described below.

The photosensitive black coating liquid is prepared, for example, by dispersing carbon or the like in a mixture of an organic solvent and a photo-crosslinkable acrylic resin and an initiator therefor, with or without a thermosetting curing agent.

A thermosetting-type black coating liquid can be prepared by adding only a thermosetting curing agent, without adding a photoinitiator. The black color material mainly containing carbon in the embodiment of the present invention refers to a black coating liquid to which carbon is added at a ratio exceeding 51 wt %, relative to the total weight of pigments.

In the second light absorptive resin layer patterns 3, the concentration can be varied in the thickness direction or a layer configuration can be changed, as in the first light absorptive resin layer patterns 1.

Figure 4:
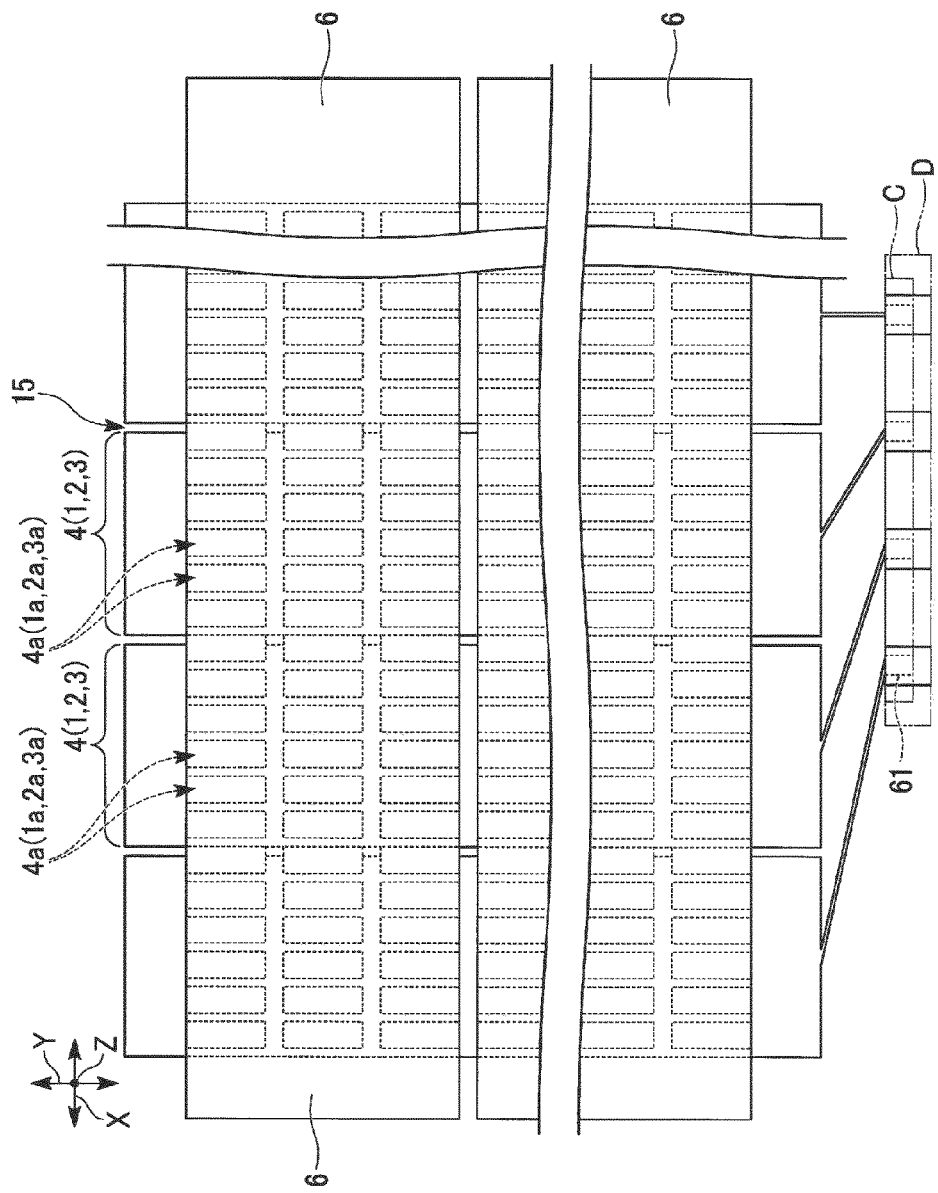
FIG. 4 is a plan view illustrating the black electrodes and transparent electrode patterns of the liquid crystal display device, according to the first embodiment of the present invention.

In the second light absorptive resin layer patterns 3, only the portions corresponding to terminals 61 are preferably removed in a region C, a part of the terminals 61 shown in FIG. 4, for example. Removal associated with the second light absorptive resin layer patterns 3 for the terminals 61 is achieved by dry etching, together with the transparent resin layer 5. This can further be followed by laminating the transparent electrode pattern 6 (conductive film such as of ITO) to provide a terminal cover.

The thickness of the black electrode 4 is desirably small. The thickness of the black electrode 4 corresponds to the total thickness of the three layers of the first light absorptive resin layer pattern 1, the metal layer pattern 2, and the second light absorptive resin layer pattern 3. If the thickness of the black electrode 4 is small, unevenness or protrusions on the surface thereof can be made small, to thereby minimize poor alignment and the like of the liquid crystal, for example. For example, the first light absorptive resin layer pattern 1 can have a thickness of 700 nm, the metal layer pattern 2 can have a thickness of 180 nm, and the second light absorptive resin layer pattern 3 can have a thickness of 400 nm. The total thickness of the black electrode 4 in this case is 1280 nm (1.28 μm). If the black electrode 4 has a small thickness, a color filter obtained by laminating colored layers such as red, green, and blue layers, as described below, is likely to be flat.

Since the black electrode 4 according to the present invention uses, in its configuration, the metal layer pattern 2 having higher light shielding properties, the thickness or the optical density of the light absorptive resin layer can be decreased. In this way, if the light absorptive resin layer is formed with a small thickness, or has a low optical density, resolution in photolithography is improved. Thus, for example, the black electrode 4 can be formed of a thin line having a line width in the range of 1 μm to 4 μm.

(Potential Role of Black Electrode and Transparent Electrode)

The black electrode described above can serve as a driving electrode (scanning electrode) of the liquid crystal display device 100 in touch sensing, for example. If the black electrode is taken to be a driving electrode in touch sensing, and the transparent electrode pattern 6 is taken to be a detection electrode, a driving condition of touch sensing can be made different from a driving condition of the liquid crystal (frequency, voltage, etc.). By making the driving frequency of touch sensing different from the driving frequency of the liquid crystal, the influence of touch sensing driving on liquid crystal driving, or vice versa, can be reduced. For example, the driving frequency of touch sensing can be set to several KHz to several tens of KHz, and the frequency of liquid crystal driving can be set to a range of 60 Hz to 240 Hz. Further, the touch sensing driving and the liquid crystal driving can also be performed in a time-division manner.

In the case of using each black electrode as a driving electrode (scanning electrode), the scanning frequency in detecting an electrostatic capacitance can be arbitrarily adjusted in conformity with a requested touch input speed. Further, to obtain quick responsiveness, black electrodes selected from all of the black electrodes (the number of the selected black electrodes is smaller than that of the entire black electrodes) can be scanned (thinned-out scanning), instead of scanning all of the plurality of black electrodes.

Alternatively, the black electrode can serve as a driving electrode (scanning electrode) to which a voltage at a constant frequency is applied. The voltage (alternating-current signal) applied to the scanning electrode may be based on an inversion driving method in which positive and negative voltage are inverted.

Alternatively, amplitude of the voltage (width of high and low voltages, peak-to-peak) of the alternating-current signal, as a touch driving voltage, to be applied can be decreased to thereby mitigate the influence on the liquid crystal display. The role of the scanning electrode and the role of the detection electrode may be switched.

The black electrodes sandwiching the metal layer pattern have a small resistance. The transparent electrode pattern 6 can also be permitted to have a small resistance, by being provided with an auxiliary conductor or the like, for example. With such low resistances, a change in electrostatic capacitance generated in touch sensing can be detected with higher accuracy. Black electrodes including a copper alloy film, that is a good conductor, can be arranged in a matrix pattern using a thin line with a width of 1 to 4 μm, for example, having a low resistance.

Due to the fringe effect of the black electrode pattern having a small line width arranged above the transparent electrode pattern 6, the electrostatic capacitance (fringe capacitance) in the vicinity of the pattern edge is increased, while the electrostatic capacitance can be increased. In other words, the difference in electrostatic capacitance between presence and absence of a touch by a pointer such as a finger can be increased, and the S/N ratio relating to touch sensing of the liquid crystal display device 100 can be increased, leading to high detection accuracy.

When viewed from a display area of the display unit 110, for example, the black electrodes serve as a black matrix with a low reflection and thus can improve visibility. By adjusting the concentration of the black color material contained in the first light absorptive resin layer pattern 1, and also adjusting the thickness of each light absorptive resin layer, and the refractive index of a resin contained in each light absorptive resin layer, reflectance of light generated at the boundary surface between the first transparent substrate 10 and the first light absorptive resin layer pattern 1 can be reduced. In addition, if the metal layer pattern 2 used in each black electrode is thin, it can completely shield visible light, and eliminate light leakage from the backlight.

Further, the black electrodes of the embodiment of the present invention are obtained by dry-etching the light absorptive resin layer patterns 1 and 3, using the metal layer or the second light absorptive resin layer as a matrix (mask). Thus, the black electrodes are characterized in that the drawn line width or shape of the light absorptive resin layer patterns 1 and 3 is substantially the same as that of the metal layer patterns 2.

Since the drawn line width of the light absorptive resin layer patterns 1 and 3 is substantially the same as that of the metal layer patterns 2, the aperture ratio of the pixels will not be lowered. Since the light absorptive resin layer patterns 1 and 3, and the metal layer patterns 2 can be formed by dry etching, these patterns can be formed with a smaller line width than in other forming methods. For example, these patterns can be formed with a line which is as thin as a metal wiring used for TFTs (thin film transistors).

The transparent resin layer 5 can be formed of an acrylic resin or the like having thermosetting properties. In this example, the transparent resin layer 5 has a thickness of 1.5 The thickness of the transparent resin layer 5 can be determined as desired as long as the metal layer pattern 2 is electrically insulated from the transparent electrode pattern 6. The first light absorptive resin layer pattern 1 or the transparent resin layer 5 described above may adopt a configuration in which a plurality of layers having different optical properties such as a refractive index are laminated, for example.

As shown in FIGS. 2 and 4, the plurality of transparent electrode patterns 6 are arranged on the transparent resin layer 5 so as to be insulated from each other, i.e. electrically independent of each other, in the second direction Y, for example. The transparent electrode patterns 6 is formed on the transparent resin layer 5 into a stripe shape extending in the first direction X perpendicular to the metal layer pattern 2.

In the liquid crystal display device with a high definition of 300 ppi or more, for example, when viewed in the laminating direction Z indicated in FIG. 4, each transparent electrode pattern 6 preferably overlaps three or more pixel openings 2a of the metal layer patterns 2 in the second direction Y. The number of the pixel openings 2a with which each transparent electrode pattern 6 overlaps in the second direction Y does not necessarily have to be three, but may be six, nine, or the like.

With such a configuration, three or more pixel openings 2a are collectively scanned in the second direction Y, and hence the time required for scanning the entire display unit 110 can be reduced.

The transparent electrode patterns 6 are formed of a conductive metal oxide referred to as ITO, and the thickness of the transparent electrode patterns 6 is, but is not limited to, 140 nm in this example. Each transparent electrode pattern 6 serves as another touch electrode to be paired with a corresponding metal layer pattern 2.

To decrease a resistance as described below, each transparent electrode pattern 6 can be provided with a thin line that is a metal film extending in the longitudinal direction of the pattern (lengthwise direction of the stripe which is the first direction X), as an auxiliary conductor.

The transparent electrode pattern 6 can be used as a detection electrode in touch sensing.

In the embodiment of the present invention, both of the black electrodes 4 and the transparent electrode patterns 6 associated with touch sensing are provided on a surface of the first transparent substrate 10, the surface of the first transparent substrate 10 being in contact with the liquid crystal layer 24 (main surface 10a). If the electrodes 4 or the electrode patterns 6 are formed on a front surface of the first transparent substrate 10 (surface on the opposite side to the main surface 10a), formation of a fringe capacitance across the black electrode 4 and the transparent electrode pattern 6 is adversely affected, due to the large thickness of the first transparent substrate 10. If the fringe capacitance formed is small, the S/N ratio at the time of touch detection is decreased.

As shown in FIGS. 3 and 4, the plurality of metal layer patterns 2 and the plurality of transparent electrode patterns 6 can be provided with terminals 61, each serving as an electrode extracting portion. These terminals 61 are desirably arranged in a region D for the terminals 61. The region D is located outside a display region that is in a rectangular shape in the entirety as defined by the plurality of pixel openings 4a.

Not all of the plurality of metal layer patterns 2 need to be used as driving electrodes for touch signals, and the metal layer patterns 2 can be driven (scanned) in a thinned-out manner, such as in a manner of using every third metal layer pattern 2 in the first direction X (thinning (skipping) two out of three metal layer patterns 2 to scan one metal layer pattern 2), for example.

The metal layer patterns 2 that are not used as driving electrodes may be in an electrically-floating form (floating patterns).

When liquid crystal is driven, the transparent electrode patterns 6 can be set to a common electrical potential, having a constant electrical potential. Alternatively, all of the transparent electrode patterns 6 can be grounded via a resistor having a high resistance.

By increasing the number of metal layer patterns 2 to be thinned to decrease the number of scan lines, the driving frequency can be lowered and power consumption can be reduced. In contrast, by performing high-density scanning to ensure improved or even high accuracy and high definition, the present invention can be utilized for fingerprint authentication or the like, for example. The number of scan lines in touch sensing may be adjusted by the control unit. The constant potential does not necessarily refer to "0 (zero)" volt, but may be an intermediate value between high and low driving voltages. The constant electrical potential may be set to driving voltage having an offset. The transparent electrode patterns 6 have a constant electrical potential, and hence the touch electrodes (black electrodes) may be driven at a frequency different from the driving frequency of the pixel electrodes that drive the liquid crystal.

Liquid crystal and touch sensing can be driven in a time-division manner. However, since the transparent electrode patterns 6 are at a constant electrical potential, liquid crystal and touch sensing may be driven at different frequencies, instead of being driven in a time-division manner. It should be noted that, if the channel layer 46 of the thin film transistor 45 is made of an oxide semiconductor such as IGZO (registered trademark), the time-division manner driving can be easily performed, as will be described below.

Figure 5:
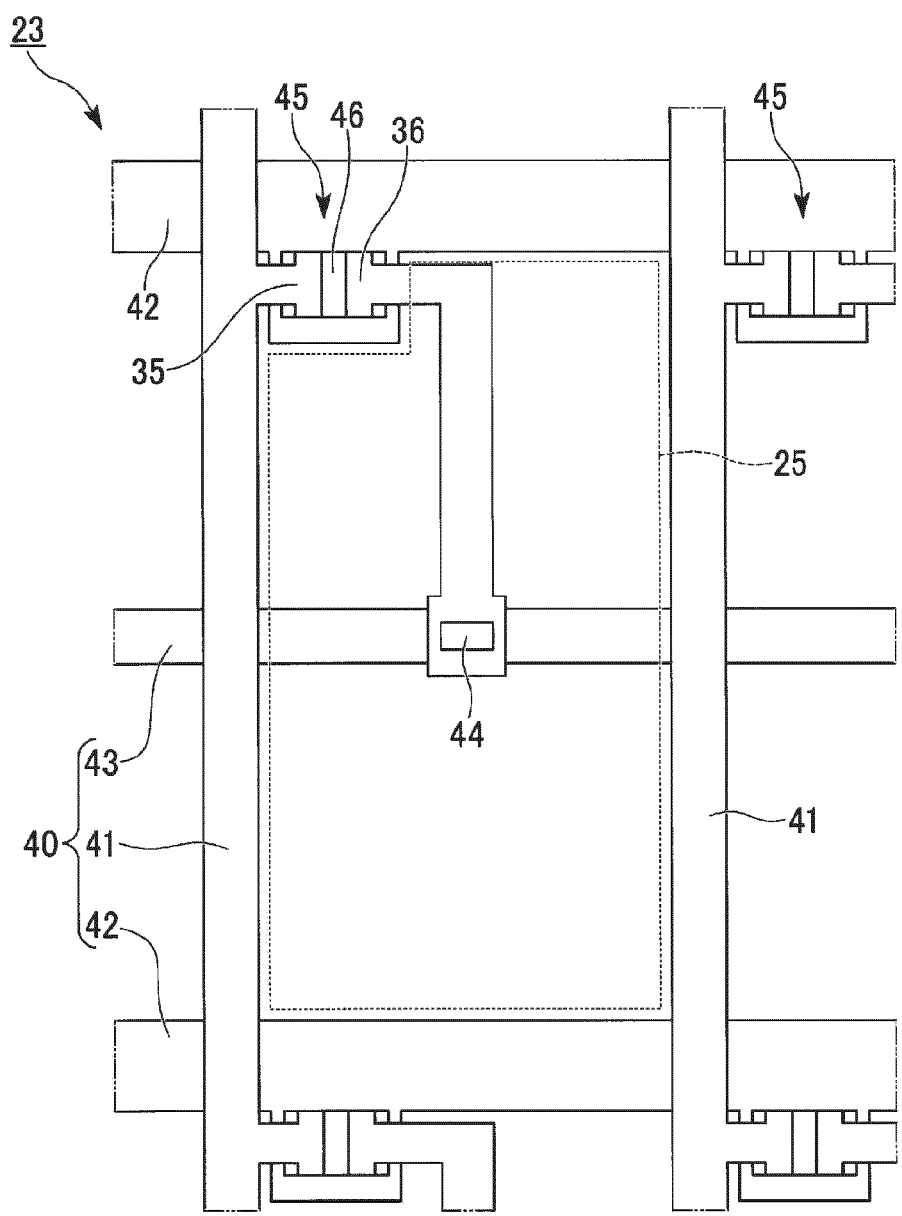
FIG. 5 is an enlarged plan view illustrating one pixel of an array substrate of the liquid crystal display device, according to the first embodiment of the present invention.

As shown in FIGS. 2 and 5, the array substrate 23 has a plurality of pixel electrodes 25, a plurality of thin film transistors 45, a metal wiring 40, and insulating layers 28 on a main surface (surface) 20a of the second transparent substrate 20, the main surface facing the liquid crystal layer 24. More specifically, the plurality of pixel electrodes 25 and the plurality of thin film transistors 45 are provided on the main surface 20a of the second transparent substrate 20 via the plurality of insulating layers 28. FIG. 2 does not show the thin film transistors 45, and FIG. 5 does not show the insulating layers 28.

Figure 18:
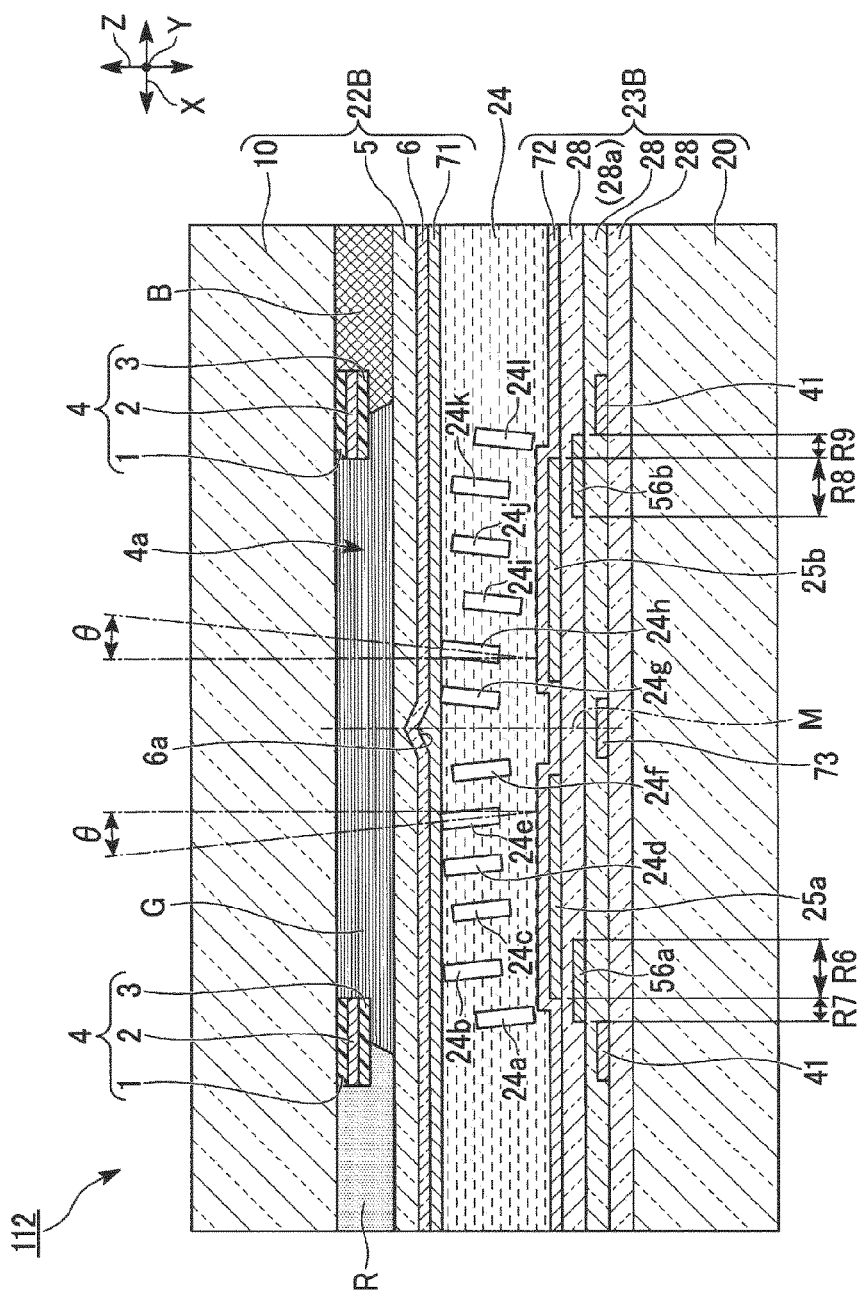
FIG. 18 is a side cross-sectional view illustrating a display unit, according to a fourth embodiment of the present invention.

The metal wiring 40 has a plurality of signal lines (source lines) 41, a plurality of scan lines (gate lines) 42, and a plurality of auxiliary capacitance lines 43. Each of the signal lines 41, the scan lines 42 and the auxiliary capacitance lines 43 have a two-layer configuration made of titanium and copper. FIG. 18 referred to in a fourth embodiment described below shows the signal line 41 and a light-shielding pattern 73.

The pixel electrodes 25 each have a known configuration, and are disposed on a surface of the insulating layer 28, the surface of the insulating layer 28 facing the liquid crystal layer 24, so as to face the pixel openings 4a of the black electrodes 4.

The metal wiring 40 may be formed of a multilayer configuration having a plurality of layers. In this case, at least one of the plurality of layers is a copper layer or a copper alloy layer, and other layers can each be a layer of a metal having a high melting point, such as titanium or molybdenum. The metal wiring 40 may be configured by laminating a metal having good conductivity, such as copper, on a horizontally-aligned CNT.

The channel layer 46 in each thin film transistor 45 can be formed of a silicon-based semiconductor such as polysilicon, or an oxide semiconductor. The channel layer 46 of the thin film transistor 45 is preferably made of an oxide semiconductor, such as IGZO (registered trademark), that contains two or more metal oxides among gallium, indium, zinc, tin, and germanium. Such a thin film transistor 45 has good memory effects (having small leak current), and therefore easily holds a pixel capacitance after application of a liquid crystal driving voltage. Accordingly, configuration can be adopted omitting the auxiliary capacitance lines 43.

Thin film transistors that use an oxide semiconductor as a channel layer have a bottom gate-type structure, for example. A top gate-type, or double gate-type transistor structure can also be used for thin film transistors. Optical sensors or other active elements can serve as thin film transistors that include a channel layer made of an oxide semiconductor.

The thin film transistor 45 that uses an oxide semiconductor such as IGZO for the channel layer 46 has high electron mobility, and can apply a necessary driving voltage in a short time of 2 msec (milliseconds) or less, for example, to the pixel electrode 25. For example, time per frame in double-speed driving (when the number of displayed frames per second is 120) is about 8.3 msec. In this case, for example, 6 msec can be allocated to touch sensing. Since the driving electrode, which is the transparent electrode pattern 6, is at a constant electrical potential, there is no need to perform liquid crystal driving and touch electrode driving in a time-division manner. The driving frequency of the pixel electrode for driving the liquid crystal can be different from the driving frequency of the touch electrode.

The thin film transistor 45 that uses an oxide semiconductor for the channel layer 46 has small leak current, as mentioned above, and hence can hold the driving voltage applied to the pixel electrode 25 for a long period of time. By forming the signal lines, the scan lines, the auxiliary capacitance lines, or the like of the active elements with copper wires having a resistance smaller than that of aluminum wires, and using IGZO that can be driven in a short period of time as active elements, a time margin is extended in scanning in touch sensing, and a change in generated electrostatic capacitance can be accurately detected. By applying an oxide semiconductor such as IGZO to the active elements, the time required for driving the liquid crystal or the like can be reduced, and sufficient margin can be ensured for the time spent in touch sensing during image signal processing of the entire display screen.

A drain electrode 36 extends from the thin film transistor 45 to the center of the pixel, and is electrically connected to the pixel electrode 25, which is a transparent electrode, via a contact hole 44. A source electrode 35 extends from the thin film transistor 45 and is electrically connected to the signal line 41.

Liquid crystal molecules of the liquid crystal layer 24 (the alignment film and the liquid crystal molecules are not shown) are used for liquid crystal driving based on VA method (vertical alignment method: longitudinal electric field method using vertically-aligned liquid crystal molecules). In the liquid crystal molecules, the initial alignment is a vertical alignment, i.e. in the laminating direction Z, perpendicular to the surfaces of the liquid crystal display device substrate 22 and the array substrate 23.

In each of the embodiments described below, a liquid crystal driving voltage is applied across the transparent electrode patterns 6 and the pixel electrodes 25 in the thickness direction of the liquid crystal layer 24, i.e. the laminating direction Z.

In general, the style in which a driving voltage is applied in the thickness direction of the liquid crystal layer is called a longitudinal electric field method. The liquid crystal layer in the longitudinal electric field method has a higher front surface transmittance, by about 20%, than the liquid crystal layer in horizontal alignment called transverse electric field method ((IPS: in plane switching) or FFS (fringe field switching) that is a method in which the liquid crystal is rotated in the horizontal direction). The front surface transmittance refers to a luminance when the liquid crystal display device is observed from a direction normal to the display area (laminating direction Z of the present embodiment).

Figure 6:
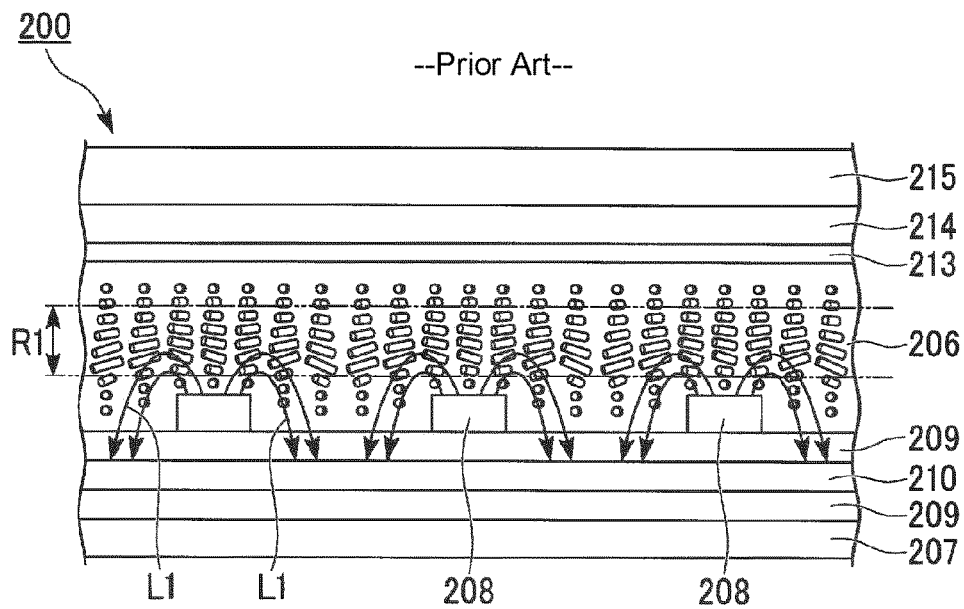
FIG. 6 is a schematic cross-sectional view illustrating a display unit of a liquid crystal display device, along with electric force lines, according to conventional art.
Figure 7:
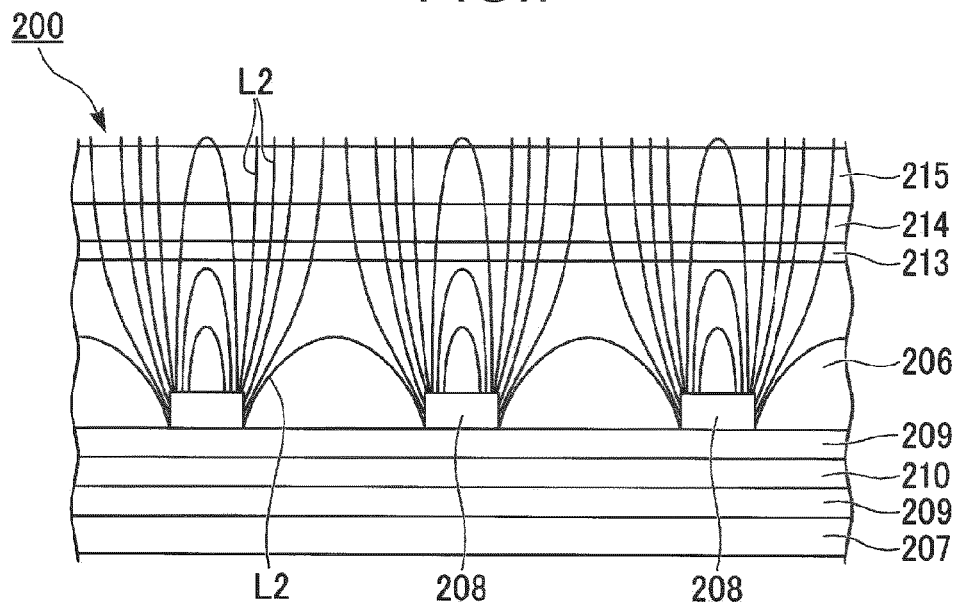
FIG. 7 is a schematic cross-sectional view illustrating the display unit of the liquid crystal display device, along with equipotential lines, according to conventional art.
Figure 8:
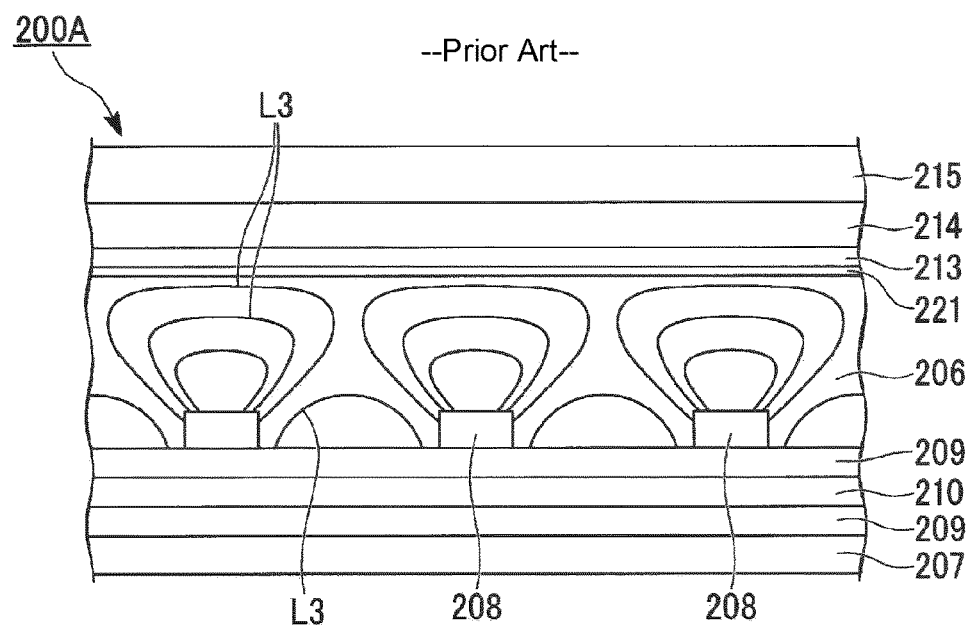
FIG. 8 is a schematic cross-sectional view illustrating a display unit of a liquid crystal display device, along with equipotential lines, according to a modification of conventional art.

Referring to FIGS. 6 to 8, the reason why the display unit of the liquid crystal display device based on FFS can have lower transmittance will be briefly described.

FIG. 6 is a schematic cross-sectional view illustrating a conventional display unit 200 based on the transverse electric-field driving method called IPS or FFS. The initial alignment of a liquid crystal layer 206 is a horizontal alignment parallel to a surface of a transparent substrate 207. The liquid crystal layer 206 is driven by a liquid crystal driving voltage applied across a pixel electrode 208 located below the liquid crystal layer 206, and a common electrode 210 located below a pixel electrode 208, via an insulating layer 209. As a result, electric force lines L1 are formed between the pixel electrode 208 and the common electrode 210.

A transparent resin layer 213, a color filter 214, and a transparent substrate 215 are arranged above the liquid crystal layer 206 in this order.

An effective thickness R1, which is a part of the liquid crystal layer 206 in the thickness direction, mainly influences the transmittance of the liquid crystal layer 206. In the longitudinal electric-field driving method mentioned in the embodiments of the present invention, substantially the entire thickness of the liquid crystal layer 24 has an effect on the transmittance (e.g., see FIG. 2). On the other hand, in the FFS liquid crystal display method that is a transverse electric-field driving method, only the effective thickness R1, which is a part of the thickness of the liquid crystal layer 206, has an effect on the transmittance of the liquid crystal layer 206. Accordingly, front surface luminance (transmittance) becomes lower in the transverse electric-field driving method than in the longitudinal electric-field driving method.

FIG. 7 is a schematic diagram illustrating equipotential lines L2 when a liquid crystal driving voltage is applied to the display unit 200. In the absence of a transparent electrode or a conductive film from the transparent substrate 215 side, the equipotential lines L2 penetrate the transparent resin layer 213, the color filter 214, and the transparent substrate 215 and extend upward. If the equipotential lines L2 are extended in the thickness direction of the liquid crystal layer 206, the effective thickness of the liquid crystal layer 206 is ensured to some extent. Therefore, the intrinsic transmittance of the display unit 200 based on the transverse electric-field driving method can be better achieved.

Let us discuss the case where a counter electrode 221 is provided between the liquid crystal layer 206 and the transparent resin layer 213 in addition to the components of the above-mentioned display unit 200, as in the case of a conventional display unit 200A shown in FIG. 8. In this case, since equipotential lines L3 do not penetrate the counter electrode 221, the shape of the equipotential lines L3 is deformed from the shape of the above-mentioned equipotential lines L2.

In this case, the effective thickness of the liquid crystal layer 206 becomes smaller than that of the liquid crystal layer 206 in the display unit 200, which can cause a significant decrease in luminance (transmittance) of the display unit 200A.

Accordingly, it is difficult to apply the touch screen recited in claims 1 to 5 of PTL 2 mentioned above to the display unit based on the transverse electric-field driving method because of the problem of transmittance. Therefore, the main objective display unit of a touch screen according to claims 1 to 5 of PTL 2 is estimated to be a liquid crystal display device based on the longitudinal electric-field driving method. However, PTL 2 fails to describe in detail the liquid crystal layer in longitudinal electric-field driving. PTL 2 fails to study the influence of the touch screen configuration on the luminance (transmittance) of the display unit.

The liquid crystal display device 100 will be described again.

Liquid crystal molecules in the liquid crystal layer 24, not shown, exhibit negative dielectric anisotropy. The liquid crystal display device 100 includes polarizing plates, not shown. These polarizing plates, in crossed nicols, are normally black. The gap of the liquid crystal cells was set to 3.6 µm, although the gap width is not limited to this.

Liquid crystal molecules, which have been aligned in the laminating direction Z as an initial alignment, are inclined in a direction intersecting the laminating direction Z, by a voltage being applied across the transparent electrode patterns 6 and the pixel electrodes 25 in the laminating direction Z to thereby perform ON display (white display).

It should be noted that the liquid crystal molecules may exhibit positive dielectric anisotropy and perform display in a normally-black mode. In this case, however, horizontal alignment processing is needed. It is convenient to use liquid crystal molecules which exhibit negative dielectric anisotropy and can be vertically aligned with simple alignment processing.

In the alignment processing of the alignment film, optical alignment can be used.

(Auxiliary Conductor)

To decrease resistance of the electrodes, an auxiliary conductor can be formed on the plurality of transparent electrode patterns 6. The auxiliary conductor may be formed of the same material as that of the metal layer pattern 2, or may be formed of a thin aluminum alloy film. The aluminum alloy can be obtained by adding an alloy element in the range of 0.2 at % to 3 at % to aluminum. As the alloy element, one or more can be selected from magnesium, calcium, titanium, indium, tin, zinc, neodymium, nickel, copper, and the like. The resistivity of the auxiliary conductor is preferably smaller than that of the transparent electrode pattern 6.

Figure 9:
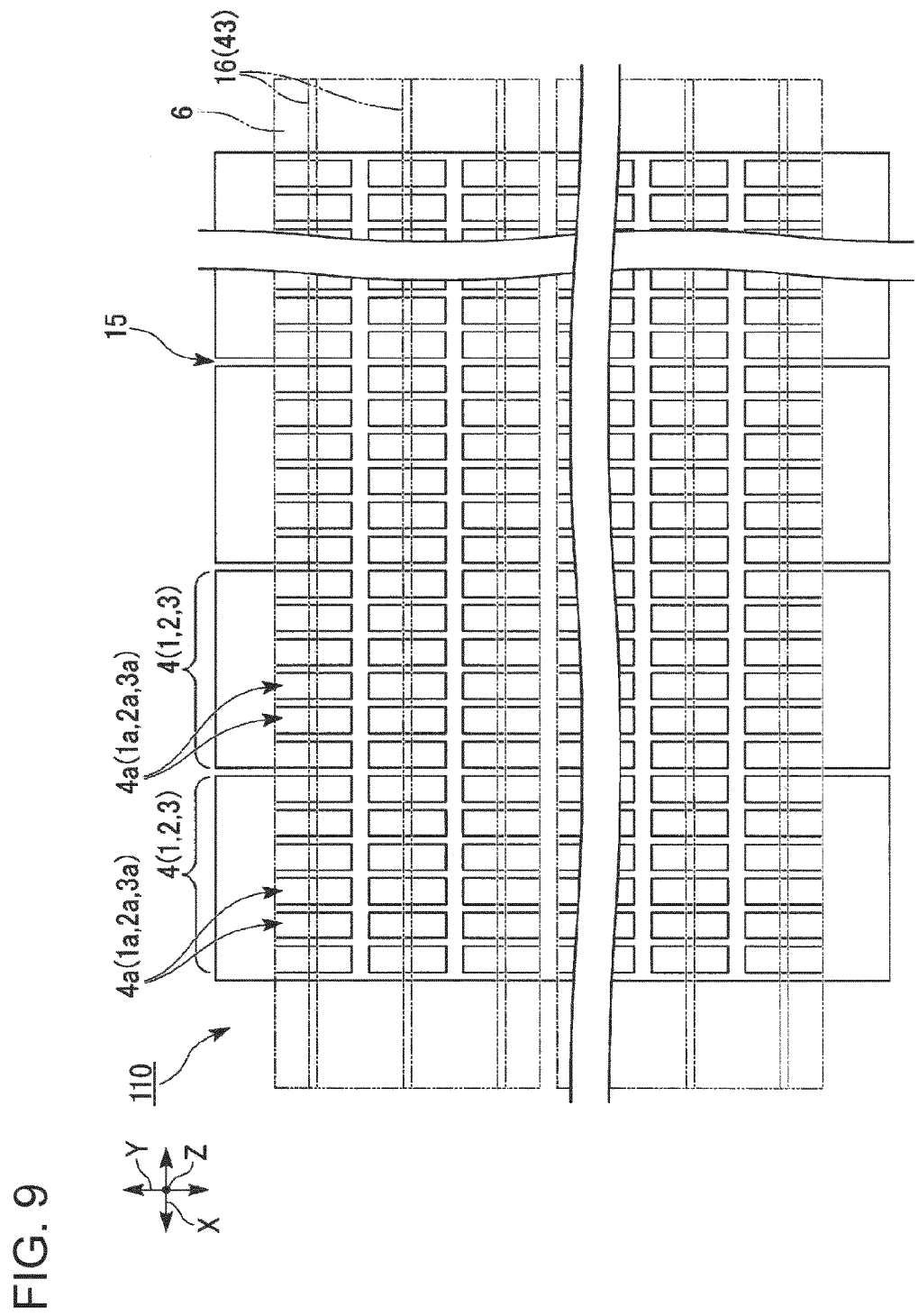
FIG. 9 is a plan view illustrating a positional relationship in a principal part of the liquid crystal display device, according to the first embodiment of the present invention.

In the plan view shown in FIG. 9, an auxiliary conductor 16 may be extended in the first direction X, and formed into a linear pattern (stripe pattern) that passes through a center portion in the second direction Y of the pixel openings 4a. In this case, when viewed in the laminating direction Z, the auxiliary conductor 16 is desirably formed at a position that overlaps the auxiliary capacitance line 43 of the array substrate 23, for example. With such a configuration, a decrease in aperture ratio can be minimized.

Figure 10:
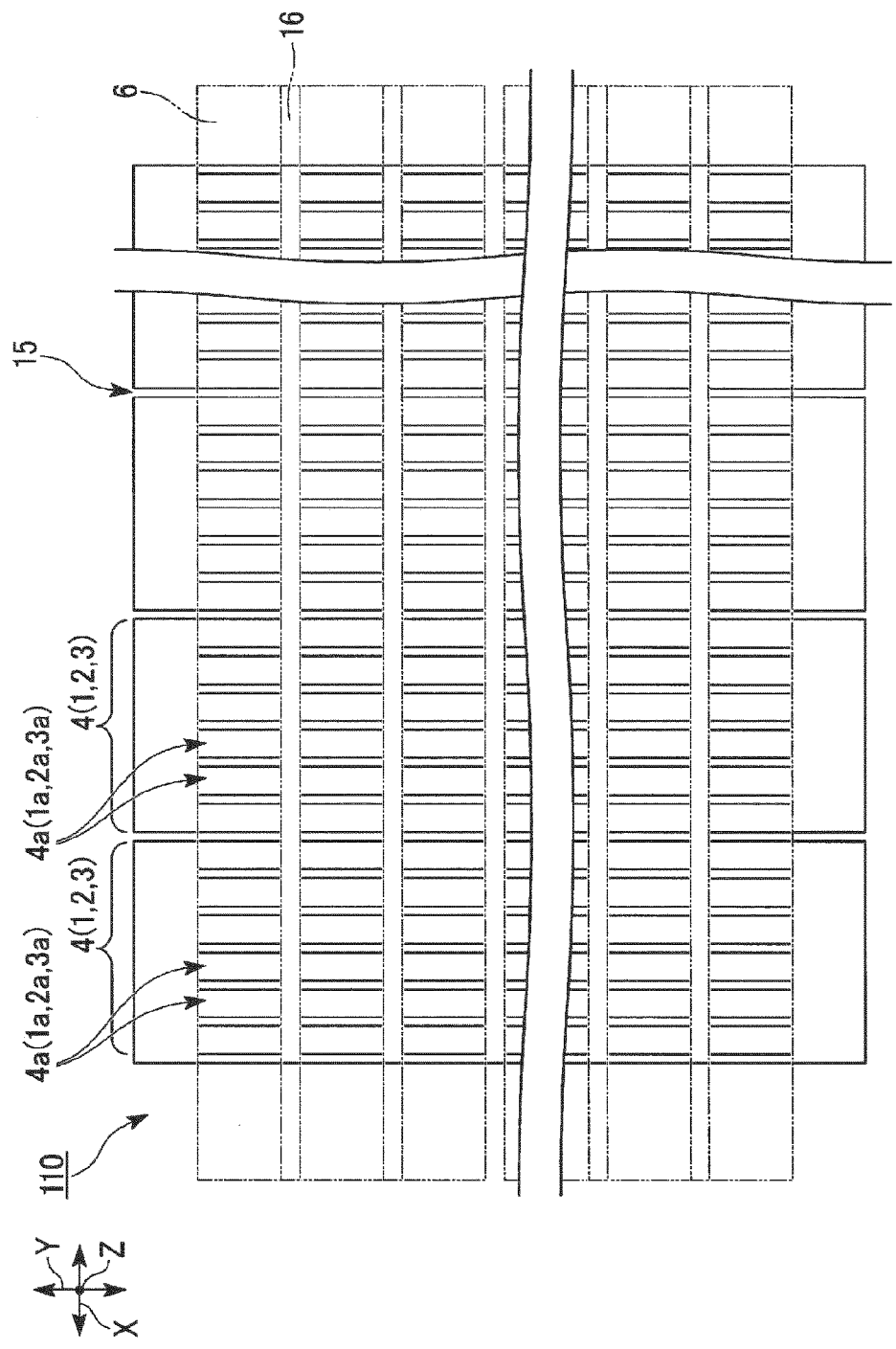
FIG. 10 is a plan view illustrating a positional relationship in a principal part of the liquid crystal display device, according to the first embodiment of the present invention.

In the plan view shown in FIG. 10, the auxiliary conductor 16 may be formed at a position of the touch electrode pattern made up of the light absorptive resin layer patterns 1 and 3 and the metal layer pattern 2, i.e. at a position of the black matrix. The metal wiring 40 forming the signal lines (the source lines) 41, the scan lines (the gate lines) 42, and the auxiliary capacitance lines 43 of the array substrate 23 is typically disposed in a lower portion of the black matrix (a position in the black matrix nearer to the second transparent substrate 20 than to the first transparent substrate 10). Accordingly, by forming the auxiliary conductor 16 at a position where the metal wiring 40 is disposed, the auxiliary conductor 16 overlaps the metal wiring 40 when viewed in the laminating direction Z and minimizes decrease in aperture ratio.

In the present embodiment, when touch sensing is performed, the transparent electrode pattern 6 is used as a detection electrode of touch sensing and, when liquid crystal is driven, used as a common electrode to which a voltage is applied to drive the liquid crystal between the pixel electrode 25 and the transparent electrode pattern 6, for example. Touch sensing and liquid crystal driving may be performed at different time points in a time-division manner, or may be performed at different frequencies.

As shown in FIG. 1, the control unit 120 has a known configuration, and includes an image signal timing controller 121 (first control unit), a touch sensing and scan signal controller 122 (second control unit), and a system controller 123 (third control unit).

The image signal timing controller 121 sets the plurality of transparent electrode patterns 6 to a constant electrical potential, and transmits a signal to the signal lines 41 and the scan lines 42 of the array substrate 23. The image signal timing controller 121 applies a liquid crystal driving voltage for displaying, to the pixel electrode 25 in the laminating direction Z, across the transparent electrode patterns 6 and the pixel electrodes 25, to thereby perform liquid crystal driving, with which liquid crystal molecules in the liquid crystal layer 24 are driven. Thus, an image is displayed on the array substrate 23.

The touch sensing/scan signal controller 122 sets the plurality of transparent electrode patterns 6 to a constant electrical potential, applies a detection driving voltage to the plurality of metal layer patterns 2 (black electrodes 4), and detects a change in electrostatic capacitance (fringe capacitance) across the metal layer patterns 2 and the transparent electrode patterns 6 to perform touch sensing.

The system controller 123 controls the image signal timing controller 121 and the touch sensing/scan signal controller 122, and can alternately perform liquid crystal driving and detection of a change in electrostatic capacitance, i.e. in a time-division manner.

(Example of Manufacturing Method for Liquid Crystal Display Device Substrate)

Next, a method of manufacturing the liquid crystal display device substrate 22 of the display unit 110 configured as described above will be described. FIG. 11 is a flowchart illustrating a method of manufacturing the liquid crystal display device substrate 22.

In forming a first coating of a light absorptive resin layer (step S11), the above-described black coating liquid having thermosetting properties was used. The first light absorptive resin layer is a resin layer before shape of the light absorptive resin layer pattern 1 is patterned. After heat treatment at 250° C., the light absorptive resin layer had a thickness of 0.7 μm. Carbon particulates were used for the black color material.

The first light absorptive resin layer may be formed so as to have a thickness other than 0.7 μm. By adjusting the thickness of the first light absorptive resin layer and the concentration of the black color material, which is carbon, the light reflection occurring at the boundary surface between the first transparent substrate 10 and the first light absorptive resin layer pattern 1 can be adjusted. In other words, by adjusting the thickness of the first light absorptive resin layer pattern 1 and the concentration of the black color material therein, the light reflection occurring at the boundary surface can be reduced to 1.8% or less.

The first light absorptive resin layer formed by coating was subjected to heat treatment at 250° C. to cure the first light absorptive resin layer.

After first the light absorptive resin layer was cured, a metal layer containing 1 at % magnesium was formed by means of a sputtering apparatus (step S12). This metal layer is a layer before shape of the metal layer pattern 2 is patterned. At an early stage of the metal layer forming step, a first metal layer containing oxygen with a thickness of 0.01 μm was formed under a gas condition in which 10 vol % oxygen gas was added to an argon gas base, followed by forming a second metal layer with a thickness of 0.17 μm only by the argon gas base, thereby obtaining a metal layer having a total thickness of 0.18 μm.

Next, a second light absorptive resin layer was formed by coating, using a black coating liquid obtained by dispersing an alkali developable photosensitive resin and a black color material, which was carbon, in an organic solvent (step S13). After being dried at 80° C., the second light absorptive resin layer was exposed and developed into a pattern shape of the black electrode, further followed by heat treatment at 250° C., thereby obtaining a black pattern with a thickness of 1.1 μm. As will be described below, the black pattern finally becomes the second light absorptive resin layer pattern 3 through dry etching (step S16) described below.

The black pattern was wet-etched to form the second light absorptive resin layer pattern 3 (step S14).

The metal layer was wet-etched to obtain the metal layer pattern 2 in which the pixel openings 2a were formed (step S15).

Next, using oxygen and a fluorocarbon gas as an introduction gas, anisotropic dry etching was performed by means of a dry etching apparatus (step S16). Through dry etching, the first light absorptive resin layer was approximately vertically processed in the thickness direction until the surface of the first transparent substrate 10 was exposed, such that the line width and the shape were equal to those of the metal layer pattern 2 in plan view. In this processing, the first light absorptive resin layer pattern 1 was formed from the first light absorptive resin layer.

In this case, due to dry etching, the thickness of the second light absorptive resin layer pattern 3 on the metal layer pattern 2 was reduced. The second light absorptive resin layer pattern 3 was left as a thin film with a thickness of 0.4 μm.

Washing and drying was performed to form the metal layer pattern 2, followed by coating an alkali soluble photosensitive acrylic resin onto the metal layer pattern 2, thereby forming the transparent resin layer 5 with a thickness of 1.6 μm (step S17). The transparent resin layer 5 was formed only in the display region, and the periphery of the display region was removed by development to expose the region of the terminals 61 made of the metal layer pattern 2.

After forming the transparent resin layer 5, a transparent conductive film called ITO was formed on the transparent resin layer 5 by means of a sputtering apparatus (step S18). The transparent conductive film was formed into the transparent electrode patterns 6 using a well-known photolithography technique (step S19). The transparent electrode patterns 6 and the metal layer patterns 2 are arrays of patterns that are electrically isolated from each other, and are arrayed via the transparent resin layer 5 in directions perpendicular to each other. In the region of the terminals 61, a transparent conductive film (film of a transparent electrode), which is ITO, is also laminated.

The resin used for the first light absorptive resin layer preferably has a low refractive index. By adjusting the refractive index of the resin, the content of the black color material such as carbon, and the thickness of the first light absorptive resin layer pattern 1, reflectance of light reflected from the boundary surface between the first transparent substrate 10 and the first light absorptive resin layer pattern 1 can be decreased to 1.8% or less, when viewed from the first transparent substrate 10.

However, since there is a limit in the refractive index of the resin, the lower limit of the reflectance of light reflected from the boundary surface is 0.2%. In the case where the solid content of the resin, such as an acrylic resin, of the black coating liquid is 14 mass %, for example, if the amount of carbon in the black coating liquid is within the range of about 6 mass % to about 25 mass %, the optical density of the first light absorptive resin layer pattern 1 per 1 μm thickness can be 0.4 to 1.8.

If the first light absorptive resin layer pattern 1 has a thickness of 0.3 μm, the effective optical density is in the range of 0.12 to 0.54. If the first light absorptive resin layer pattern 1 has a thickness of 0.7 μm, the effective optical density is within the range from 0.28 to 1.26.

The liquid crystal display device substrate 22 of the display unit 110 is configured by laminating the plurality of first light absorptive resin layer patterns 1, the plurality of metal layer patterns 2, the plurality of second light absorptive resin layer patterns 3, the transparent resin layer 5, and the plurality of transparent electrode patterns 6 in this order on the main surface 10a of the first transparent substrate 10.

In the display unit 110 configured in this way, retroreflection or diffused reflection of light in the liquid crystal cell, for example, is reduced by the second light absorptive resin layer patterns 3. For example, the light emitted from a backlight, not shown, and incident from the second transparent substrate 20 is prevented from being retroreflected at a surface of each metal layer pattern 2, and light incident on an active element such as TFT is reduced. In addition, a reddish reflection color of the copper alloy can be prevented from adversely affecting liquid crystal display.

The liquid crystal display device substrate 22 is manufactured with the procedure described above.

(Effect of Touch Electrode)

The following description addresses an effect of the touch electrode in the display unit 110, in particular, configured as described above.

According to the display unit 110, each transparent electrode pattern 6 can be used as a detection electrode in touch sensing, and each black electrode 4 can be used as a scanning electrode to which a voltage is applied at a constant frequency.

Figure 12:
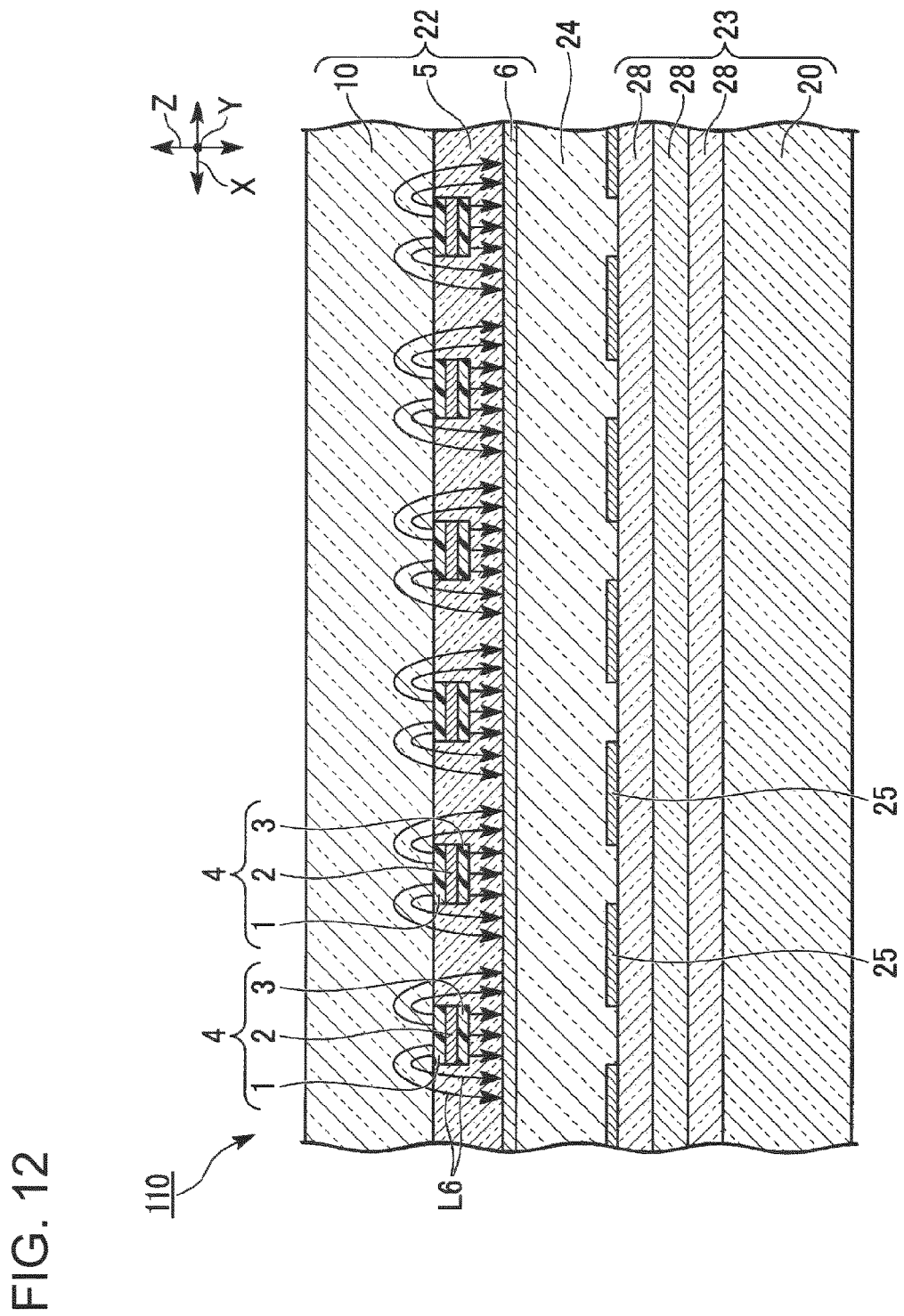
FIG. 12 is a cross-sectional view illustrating effects of a touch electrode of the liquid crystal display device, according to the first embodiment of the present invention.

Specifically, as shown in FIG. 12, an electrostatic capacitance for touch sensing is generated between the black electrode 4 and the transparent electrode pattern 6. In a normal state, a detection driving voltage at a constant frequency is applied across the black electrode 4 and the transparent electrode pattern 6, and a fringe electric field is formed in the vicinity of the black electrode 4.

Figure 13:
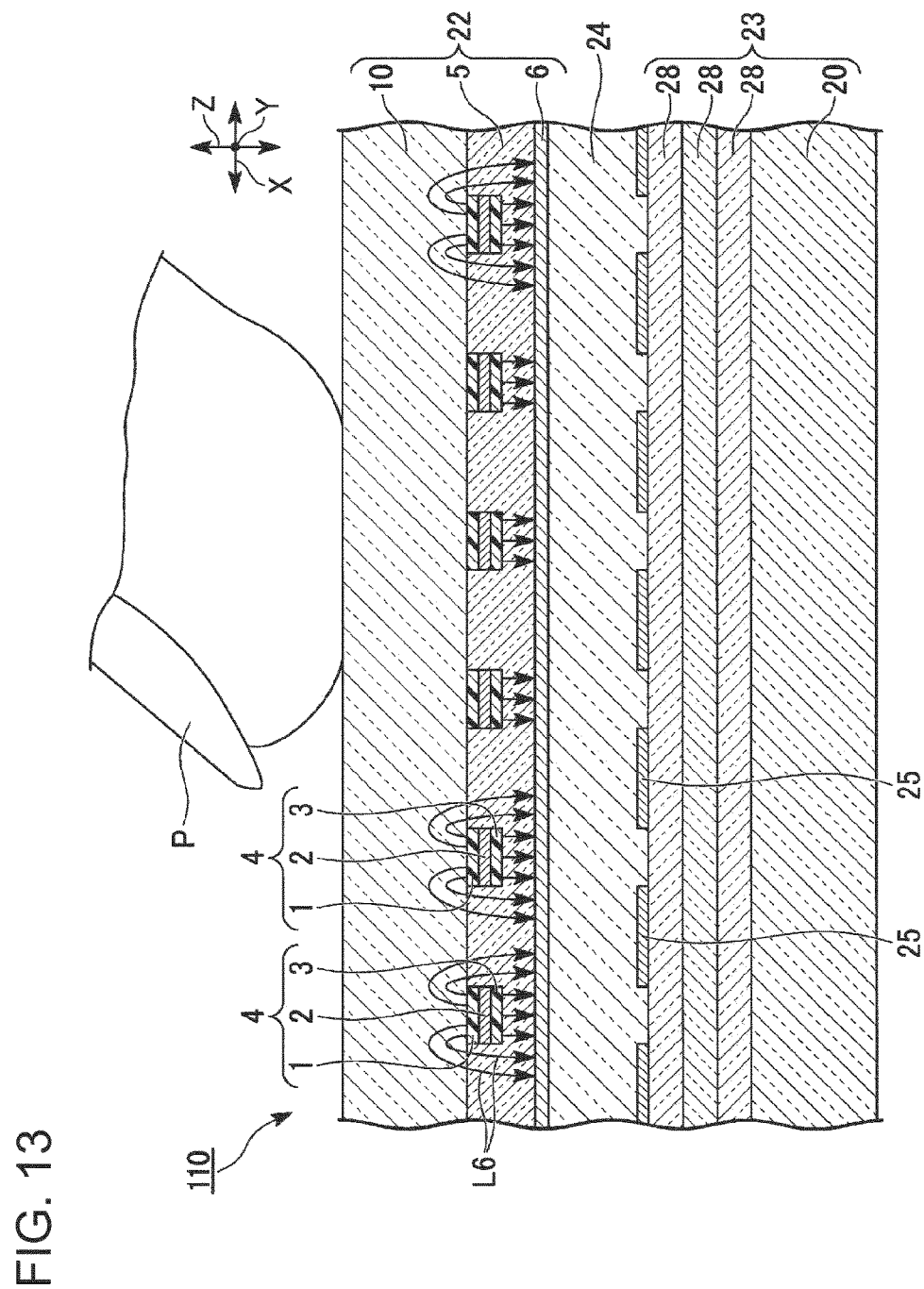
FIG. 13 is a cross-sectional view illustrating effects of the touch electrode of the liquid crystal display device, according to the first embodiment of the present invention.

As shown in FIG. 13, if the pointer P such as a finger approaches or contacts a display screen of the black electrodes 4, for example, the distribution of the electric force lines L6 is distorted, and an electrostatic capacitance is soaked into the pointer P, decreasing electrostatic capacitance across the black electrodes 4 and the transparent electrode patterns 6. Whether there is a touch by the pointer P is sensed by such a change in electrostatic capacitance. Since the spacing between the adjacent black electrodes 4 is small in general, the pointer P simultaneously acts on a plurality of touch electrodes.

Each black electrode 4 according to the present embodiment includes the metal layer pattern 2 formed of at least one of an alloy layer containing copper having a small resistance as a main material, and a copper layer. The black electrode 4 can be used as a scanning electrode in touch sensing. Each transparent electrode pattern 6 according to the present embodiment can have a large pattern width so as to decrease resistance of the electrode, and can include thereon the auxiliary conductor 16 to decrease resistance of the electrode. Therefore, the two sets of electrode groups in the capacitive method of the present embodiment can significantly reduce a time constant associated therewith and significantly improve detection accuracy in touch sensing.

As described above, according to the liquid crystal display device 100 of the present embodiment, the plurality of first light absorptive resin layer patterns 1, the plurality of metal layer patterns 2, and the plurality of the second light absorptive resin layer patterns 3 are formed into the same shape and in alignment when viewed in the laminating direction Z. Accordingly, the area of each of the pixel openings 1a, the pixel openings 2a, and the pixel opening portions 3a formed in the laminating direction Z can be enlarged, and the aperture ratio can be improved.

The first light absorptive resin layer patterns 1 are provided on the perimeter of each pixel, and hence the perimeter of the pixel can be recognized as being black. Thus, display contrast is improved to thereby enhance visibility.

The pixel electrodes 25 are absent from between the adjacent black electrodes 4 of the liquid crystal display device substrate 22. Accordingly, the electrostatic capacitance of the touch electrode can be increased and the accuracy in detecting the position of the pointer P can be enhanced.

The transparent electrode patterns 6 are used in common by the black electrodes 4 and the pixel electrodes 25. Accordingly, the number of electrodes included in the display unit 110 can be reduced to simplify the configuration of the display unit 110.

The driving frequency, or the timing of driving or signal detection for the black electrode as a touch electrode can be set without relying on the driving frequency or the timing of the liquid crystal.

When liquid crystal display is off, or is black, a driving voltage for the black electrode is supplied to not all the frames of electrode driving in each touch sensing, but is applied, one time, to a plurality of thinned-out frames to detect a touch position, thereby reducing power consumption of the liquid crystal display device 100.

For example, the driving frequency for the touch electrode can be higher than the frequency for liquid crystal driving.

In the present embodiment, the black electrodes 4, i.e. the metal layer patterns 2 extend in the second direction Y, and the transparent electrode patterns 6 extend in the first direction X. However, the present embodiment may be configured such that the black electrodes 4 extend in the first direction X and the transparent electrode patterns 6 extend in the second direction Y.

The liquid crystal display device of the present includes, for example, a backlight unit made up of three color LEDs emitting red, green and blue light, for example, and uses a field sequential technique that synchronizes the three-color light emissions with liquid crystal display to thereby realize color display.

If a white LED including three wavelength components of emitting red, green and blue light is used, a liquid crystal display device substrate including a color filter as in the subsequent embodiment, for example, can be used to achieve color display.

Second Embodiment

Referring now to FIGS. 14 to 17, a second embodiment of the present invention will be described. Those components which are identical with those of the foregoing embodiment are given the same reference signs to omit duplicate description and to provide description focusing on differences.

Figure 14:
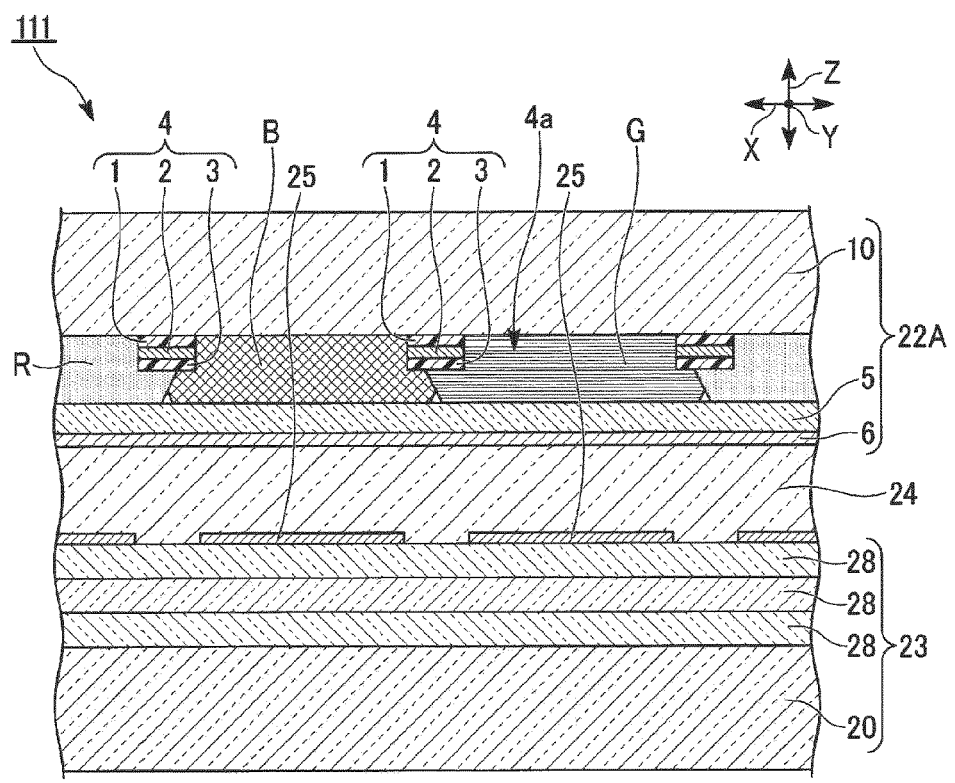
FIG. 14 is a side cross-sectional view illustrating a display unit, according to a second embodiment of the present invention.

As shown in FIG. 14, a display unit 111 of the present embodiment includes a liquid crystal display device substrate 22A, in place of the liquid crystal display device substrate 22 of the display unit 110 of the first embodiment. The liquid crystal display device substrate 22A is configured such that the pixel opening 4a of each black electrode 4 of the liquid crystal display device substrate 22 is provided with any of a red pixel R formed of a red layer, a green pixel G formed of a green layer, and a blue pixel B formed of a blue layer. The red pixel R, green pixel G, and blue pixel B are each inserted between the metal layer pattern 2 and the transparent resin layer 5 in the laminating direction Z, and disposed adjacently to each other when viewed in the laminating direction Z. The liquid crystal layer 24 is a vertically-aligned liquid crystal as in the first embodiment.

In other words, the display unit 111 includes white LED elements that include red, green, and blue light-emitting components, as a backlight, and are provided with red, green and blue color filters to thereby perform color display.

Figure 15:
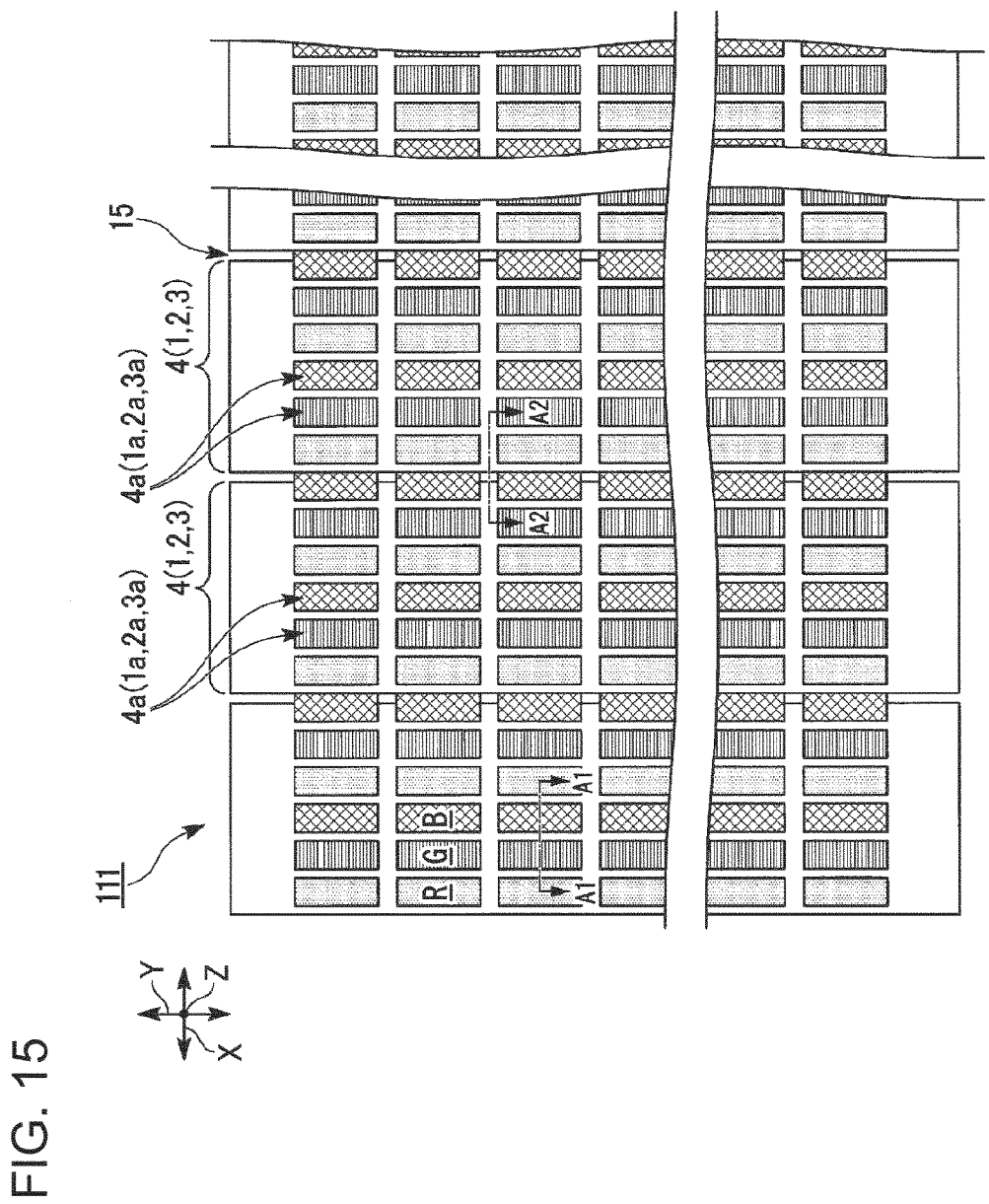
FIG. 15 is a plan view illustrating the display unit, according to the second embodiment of the present invention.

FIG. 15 is a plan view of the display unit 111 as viewed from above the first transparent substrate 10. The pixel openings 4a provided with any of the red, green and blue pixels R, G and B are arranged without a gap.

Figure 16:
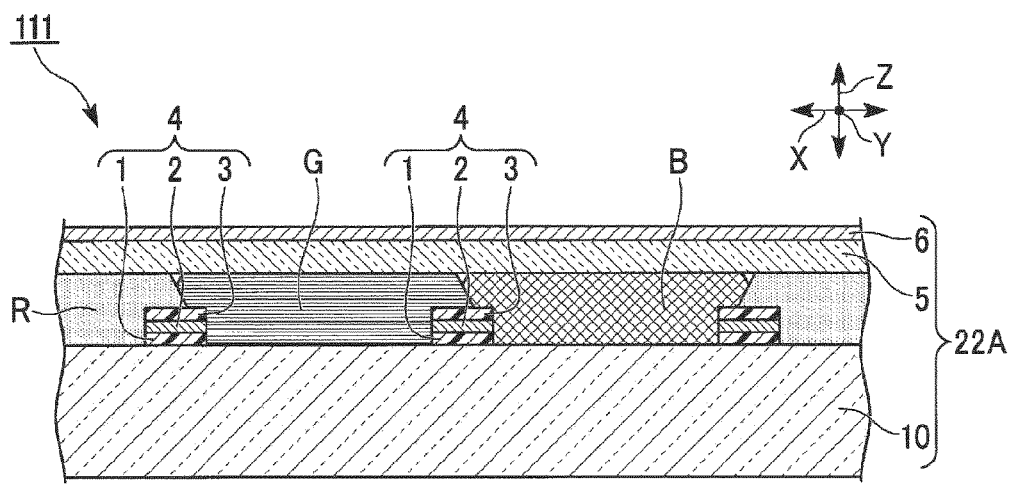
FIG. 16 is a cross-sectional view taken along the line A1-A1 of FIG. 15.

As shown in FIG. 16, the red, green and blue pixels R, G and B are arranged as color filters without a gap on the first transparent substrate 10 and on the black electrodes 4. Each of the red, green and blue pixels R, G and B is formed by a well-known photolithography technique, by dispersing several organic pigments in a transparent resin, such as an acrylic resin.

The transparent resin layer 5 is laminated on the color filters. The transparent electrode patterns 6 are further laminated on the transparent resin layer 5. The transparent electrode patterns 6 can be formed of a transparent conductive film such as of a conductive metal oxide called ITO, for example, and can be patterned by a well-known photolithography technique.

In the present embodiment, when touch sensing is performed, i.e. when detecting a change in electrostatic capacitance, the transparent electrode pattern 6 is used as a detection electrode in touch sensing, and, when driving liquid crystal, used as a common electrode to which a voltage is applied to drive the liquid crystal between the common electrode and the pixel electrode 25, for example. Liquid crystal driving is alternated with detection of a change in electrostatic capacitance. In other words, detection is performed at different time points in a time-division manner.

In place of the source signals supplied from the plurality of signal lines, positive-polarity signals and negative-polarity signals can be alternately inputted to odd-numbered rows and even-numbered rows, for example, to perform dot inversion driving of adjacent pixels.

Alternatively, the transparent electrode pattern 6 can serve as a driving electrode (scanning electrode) to perform common electrode inversion driving in which a positive polarity and a negative polarity are inverted.

Figure 17:
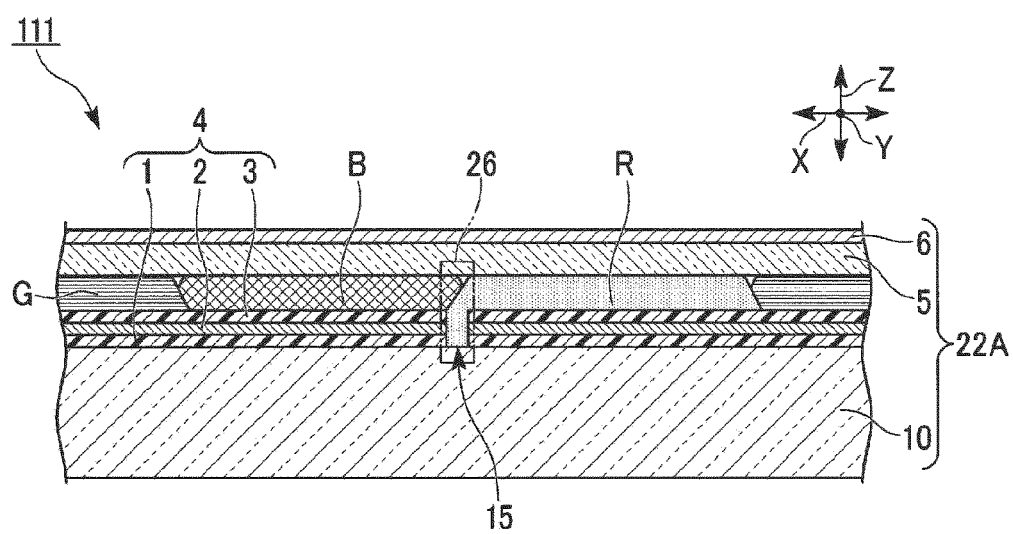
FIG. 17 is a cross-sectional view taken along the line A2-A2 of FIG. 15.

As shown in FIG. 17, a set of first light absorptive resin layer pattern 1 and the metal layer pattern 2, and the second light absorptive resin layer pattern 3, each forming part of the black electrode 4, is electrically isolated due to the spacing 15. A color overlay portion 26 of the color filters is disposed on the spacing 15, where two colors are overlaid to minimize transmission of light emitted from the backlight unit. In the color overlay portion 26, the red and blue pixels R and B are preferably overlaid.

Although not shown, at a position where the spacing 15 is provided, there is arranged any of the signal line (source line) 41, the scan line (gate line) 42, and the auxiliary capacitance line 43 provided to the array substrate 23, or a metal wiring pattern similar to these lines, so as to fill the spacing 15 in plan view. This arrangement can contribute to eliminating light leakage from the backlight unit.

The display unit 111 configured in this way can be manufactured using the method of manufacturing the liquid crystal display device substrate of the first embodiment, by inserting the red, green and blue pixels R, G and B between the metal layer patterns 2 and the transparent resin layer 5 through the plurality of pixel openings 4a, after forming the metal layer patterns 2.

In this case, in the flowchart shown in FIG. 11, a step of forming a color filter (R, G, B) is inserted between the step S16 of dry etching the first light absorptive resin layer pattern and the step S17 of forming the transparent resin layer by coating.

Third Embodiment

The following description addresses a third embodiment of the present invention. Those components which are identical with those of the foregoing embodiments are given the same reference signs to omit duplicate description and to provide description focusing on differences.

The present embodiment is similar to the first embodiment except for the configuration of the metal layer patterns 2, i.e., the configuration of the black electrodes 4. Therefore, FIG. 2 is incorporated by reference. However, duplicate description is omitted, and the metal layer pattern 2 having differences will be described. The black electrodes 4 of the present embodiment can be used as the black electrodes of the second embodiment described above and a fourth embodiment which will be described below.

In the present embodiment, the metal layer patterns 2 shown in FIG. 2 are each formed of a layer having a total thickness of 0.21 µm. This layer is obtained by laminating two layers, namely, a first metal layer (layer) made of a copper alloy containing oxygen and having a thickness of 0.015 µm, and a second metal layer (layer) made of a copper alloy containing substantially no oxygen and having a thickness of 0.18 µm, and further laminating, on the two layers, a copper-indium alloy layer that is a copper alloy layer made of copper and indium and having a thickness of 0.015 µm. Specifically, each metal layer pattern 2 is configured of a plurality of layers, and of the plurality of layers, the layer nearest to the second transparent substrate 20 is the copper-indium alloy layer.

Containing substantially no oxygen refers to introducing no oxygen gas in forming the copper alloy film. The copper alloy containing oxygen refers to that, when a film of this portion is formed, a 10 at % oxygen gas is introduced into an argon-based gas, for example, for film formation.

As the two metal layers formed in advance (first and second metal layers), a copper alloy containing 0.5 at % magnesium and 0.5 at % aluminum (the rest is copper) was used.

The copper-indium alloy layer was made of a copper alloy containing 78 at % copper and 22 at % indium.

It should be noted that a minute amount of inevitable impurity is contained in these copper alloys. The amount of indium to be added to the copper alloys can be in the range of 0.5 at % to 40 at %. Indium has a low melting point. There is a concern that a copper alloy, to which indium has been added at an amount exceeding 50 at %, raises a problem relating to heat resistance.

The copper alloy film including an indium-rich copper-indium alloy layer, such as one containing 22 at % indium, forms indium oxide prior to forming copper oxide, due to the heat treatment step after film formation or aging, and minimizes formation of copper oxide. Indium oxide, which can be a good electrically conductive film, hardly suffers from loss of electrical contact. If the amount of copper oxide formed is small, electrical connection is easily established between a cover terminal and the transparent conductive film, and reliability in the manufacturing process or in mounting can be improved.

A surface of the copper-indium alloy layer achieves a near-white reflection color, and thus reddening caused by copper as a simple substance can be avoided. The reflection color can be neutralized by adjusting not only the ratio of indium to be added, but also the ratio of alloy elements to be added, as exemplified above. The technique relating to these copper alloys disclosed in the embodiment of the present invention can be applied to the metal wiring 40 of the array substrate 23.

The indium-rich copper-indium alloy contains 10 to 40 at % indium. By making the copper-indium alloy rich, formation of copper oxide is minimized on a surface section, thereby easily establishing electrical contact as described above.

For example, in a two-layer configuration copper alloy film made up of a copper-titanium alloy as a surface layer, and a dilute alloy (copper alloy containing 3 at % or less alloy elements) as an inner copper alloy, if the content of titanium relative to copper exceeds 10 at %, the etching rate in conducting wet etching is decreased. In this case, the low-etching rate leads to an etching failure of causing the copper alloy film in the titanium-rich surface section to remain in a canopy-like shape.

In the copper-indium alloy, if the amount of the alloy elements is not uniform in the distribution in the thickness direction of the copper alloy film, such an etching failure is unlikely to occur. The copper-indium alloy, where the additive amount of indium to the copper alloy is in the range of 0.5 at % to 40 at %, has a heat resistance up to about 500° C., and hence is sufficiently adaptable to an annealing treatment, at 350° C. to 500° C., of an array substrate including thin film transistors using IGZO as a channel layer, for example. The metal wiring 40 of the array substrate 23 can be formed of the copper-indium alloy.

In the present embodiment, when touch sensing is performed, the transparent electrode pattern 6 is used as a detection electrode, and, when liquid crystal is driven, used as a common electrode to which a voltage is applied to drive the liquid crystal between the transparent electrode pattern 6 and the pixel electrode 25. In touch sensing, the detection electrodes may be set to the same common electrical potential, and may be connected to a conductive casing, for example, so as to be set to a ground electrical potential. Touch sensing driving and liquid crystal driving can be performed at different timings in a time-division manner.

Fourth Embodiment

With reference to FIGS. 18 and 19, a fourth embodiment of the present invention will be described. Those components which are identical with those of the foregoing embodiments are given the same reference signs to omit duplicate description but to provide description focusing on differences.

As shown in FIG. 18, a display unit 112 of the present embodiment includes a liquid crystal display device substrate 22B including color filters (R, G, B), the liquid crystal layer 24, and an array substrate 23B.

A concave portion 6a is formed in a surface of each transparent electrode pattern 6 of the liquid crystal display device substrate 22B facing the second transparent substrate 20. The concave portion 6a is formed at a position of the transparent electrode pattern 6, the position overlapping the center portion of the pixel opening 4a in the first direction X, in plan view, i.e. when viewed in the laminating direction Z. The concave portion 6a extends in the second direction Y. The concave portion 6a can be formed by a well-known photolithography technique when the resin material of the transparent resin layer 5 is an alkali soluble photosensitive resin, for example. Liquid crystal molecules 24a to 24l in the liquid crystal layer 24 positioned facing the concave portion 6a become able to respond at high speed.

The liquid crystal display device substrate 22B has an alignment film 71 between the transparent electrode pattern 6 and the liquid crystal layer 24.

In plan view, a pixel, a reference sign of which is omitted, is line-symmetrical to a center line M which is parallel to the lateral sides of the pixel opening 2a formed into a polygonal shape and divides the pixel in two parts.

The array substrate 23B includes a pair of pixel electrodes 25a and 25b replacing the pixel electrode 25 of the array substrate 23 and corresponding to each pixel, a pair of auxiliary capacitance electrodes 56a and 56b, and an alignment film 72.

The pixel electrodes 25a and 25b as well as the auxiliary capacitance electrodes 56a and 56b are arranged so as to be line-symmetrical to the center line M. The auxiliary capacitance electrodes 56a and 56b are arranged on a surface of the insulating layer 28a, the surface of the insulating layer 28a being opposite to the pixel electrodes 25a and 25b, the insulating layer 28a being an insulating layer 28 nearest to the liquid crystal layer 24 among the plurality of the insulating layers 28. Specifically, the auxiliary capacitance electrodes 56a and 56b are formed so as to be located farther from the liquid crystal layer 24 than the pixel electrodes 25a and 25b are located, in the laminating direction Z, via the insulating layer 28a.

When viewed parallel to the laminating direction Z, an overlap (part) R6 of the auxiliary capacitance electrode 56a overlaps the pixel electrode 25a, but an extension (remaining part) R7 of the auxiliary capacitance electrode 56a does not overlap the pixel electrode 25a. Similarly, when viewed parallel to the laminating direction Z, an overlap (part) R8 of the auxiliary capacitance electrode 56b overlaps the pixel electrode 25b, but an extension (remaining part) R9 of the auxiliary capacitance electrode 56b does not overlap the pixel electrode 25b. The extensions R7 and R9 of the auxiliary capacitance electrodes 56a and 56b, respectively, may each have a small length (extension amount) in the range of about 1 μm to about 6 μm, for example, in the first direction X. The extension amount of each of the extensions R7 and R9 is adjustable as appropriate depending on the material of the liquid crystal, the driving condition, the thickness of the liquid crystal layer 24, and the like.

The auxiliary capacitance electrode 56a is spaced apart from the center line M more than the pixel electrode 25a is. Specifically, the extension R7 of the auxiliary capacitance electrode 56a is spaced apart from the center line M more than the overlap R6 of the auxiliary capacitance electrode 56a is.

The auxiliary capacitance electrodes 56a and 56b can be set to a common electrical potential, which is equal to the constant electrical potential of the transparent electrode pattern 6 included in the liquid crystal display device substrate 22B, or can be grounded. Alternatively, when a liquid crystal driving voltage is applied to the pixel electrodes 25a and 25b, the auxiliary capacitance electrodes 56a and 56b can be set to an electrical potential different from that of the liquid crystal driving voltage, or can be set to a reverse potential (with reversed sign).

Since the transparent electrode pattern 6 is at a constant electrical potential, by applying a different potential to the auxiliary capacitance electrodes 56a and 56b for a short period of time, seizing of the liquid crystal can be prevented, or high-speed response of the liquid crystal can be achieved.

An auxiliary capacitance is formed at the overlap R6 between the pixel electrode 25a and the auxiliary capacitance electrode 56a, and is formed at the overlap R8 between the pixel electrode 25b and the auxiliary capacitance electrode 56b.

A light-shielding pattern 73 is provided at a position between the insulating layers 28 so as to be in alignment with the concave portion 6a, when viewed in the laminating direction Z. The light-shielding pattern 73 is formed of the same material as that of the signal line 41.

The auxiliary capacitance electrodes 56*a* and 56*b* and the pixel electrodes 25*a* and 25*b* are all formed of a transparent electrically conductive film such as ITO. The pixel electrodes 25*a* and 25*b* are electrically connected to a thin film transistor 45, which is not shown, and a liquid crystal driving voltage is applied to the pixel electrodes 25*a* and 25*b* via the thin film transistor 45.

The liquid crystal molecules 24*a* to 24*l* in the liquid crystal layer 24 exhibit negative dielectric anisotropy. In FIG. 18, the liquid crystal molecules 24*a* to 24*l* are shown in an initially aligned state where no voltage is applied to the pixel electrodes 25*a* and 25*b*.

The alignment films 71 and 72 give a pretilt angle θ to the liquid crystal molecules such that the liquid crystal molecules 24*a* to 24*l* is tilted relative to the longitudinal direction, from the laminating direction Z to a direction in which the auxiliary capacitance electrodes 56*a* and 56*b* are offset from the pixel electrodes (so that end portions of the liquid crystal molecules are spaced apart from the center line M, the end portions being ones nearer to the first transparent substrate 10).

The display unit 112 includes a polarizing plate, a phase difference plate, and the like, as in typically used display units. These components are not shown in FIG. 18.

It should be noted that the display unit 112 may include one to three phase difference plates bonded to a polarizing plate.

The following description of the present embodiment sets forth the case where the auxiliary capacitance electrodes 56*a* and 56*b* are used as common electrodes having an electrical potential equal to that of the transparent electrode patterns 6.

The aligned films 71 and 72 give the pretilt angle θ to the liquid crystal molecules 24*a* to 24*l* such that the liquid crystal molecules 24*a* to 24*l* are tilted from the laminating direction Z to a direction in which the auxiliary capacitance electrodes 56*a* and 56*b* extend from the pixel electrodes 25*a* and 25*b*, and are line-symmetrical to the center line M. The alignment film 72 is formed at least between the liquid crystal layer 24 and a surface of each of the pixel electrodes 25*a* and 25*b*.

The display unit 112 of the present embodiment is formed by bonding the liquid crystal display device substrate 22B to the array substrate 23B via the liquid crystal layer 24, for example. In alignment processing, the vertically-aligned alignment films 71 and 72 can be irradiated with electromagnetic waves such as light, while a liquid crystal driving voltage (e.g., an alternating-current voltage or direct-current voltage ranging from 1 V to 20 V) is applied to the pixel electrodes 25*a* and 25*b*. Through this processing, the liquid crystal molecules 24*a* to 24*l* can be imparted with the pretilt angle θ. The light used in the alignment processing may be polarized light, or may be non-polarized light.

In the present embodiment, the pretilt angle θ represents an angle relative to the normal direction of the substrate surface (laminating direction Z), when the normal direction is taken to be 0°. The pretilt angle θ can be measured by a crystal rotation method described in Journal of Applied Physics, Vol. 48 No. 5, pp. 1783-1792 (1977), for example, or other methods.

As shown in FIG. 19, when a liquid crystal driving voltage is applied to the pixel electrodes 25*a* and 25*b*, an electric field expressed by electric force lines L9 is formed from the pixel electrodes 25*a* and 25*b* toward the auxiliary capacitance electrodes 56*a* and 56*b* (more specifically, the extensions R7 and R9). Simultaneously, an electric field expressed by vertical or oblique electric force lines L10 is formed from the pixel electrodes 25*a* and 25*b* toward the transparent electrode pattern 6. Conforming to these oblique electric fields, the liquid crystal molecules 24*a* to 24*f* are inclined in an activation direction D1 of the first direction X. More specifically, the liquid crystal molecules 24*a*, 24*b*, and 24*f* are inclined immediately after a liquid crystal driving voltage is applied thereto. Then, immediately after being influenced by the inclined liquid crystal molecules 24*a*, 24*b*, and 24*f*, the liquid crystal molecules 24*c* to 24*e* are inclined in the activation direction D1.

The liquid crystal molecules 24*g* to 24*l* are inclined in an activation direction D2 opposite to the activation direction D1. The liquid crystal molecules 24*a* and 24*l* located in an effectively strong electric field are activated the earliest, and serve as a trigger for increasing the speed of liquid crystal display. The liquid crystal molecules 24*b* to 24*f* and 24*g* to 24*k* in the oblique electric field are also activated at high speed, similarly to the liquid crystal molecules 24*a* and 24*l*. The liquid crystal molecules 24*b* to 24*f* and 24*g* to 24*k* are activated in harmonization with the liquid crystal molecules 24*a* and 24*l* to thereby increase the speed of liquid crystal display.

By inclining the liquid crystal molecules 24*a* to 24*l* by an oblique electric field as in the present embodiment, the liquid crystal molecules 24*a* to 24*l* having the small pretilt angle θ can be driven as if they had an essentially large pretilt angle. Accordingly, with the liquid crystal molecules 24*a* to 24*l* being inclined by the oblique electric field, high-speed liquid crystal display can be realized.

For example, with the liquid crystal molecules 24*a* to 24*l* being inclined by the oblique electric field, the liquid crystal molecules 24*a* to 24*l* can be activated at high speed, if the pretilt angle θ is small as in the range of about 0.1° to about 0.9°. In the vertically-aligned liquid crystal display, the liquid crystal molecules having a large pretilt angle are easily inclined. However, the large pretilt angle tends to cause light leakage during black display as well, and decrease contrast.

In the present embodiment, touch sensing using the black electrodes 4 and the transparent electrode patterns 6, as touch electrodes, is similar to the touch sensing such as in the first embodiment, as far as the configuration and the driving means are concerned. Therefore, duplicate description is omitted.

The first and fourth embodiments of the present invention have been described in detail with reference to the drawings, but the specific configurations are not limited to these embodiments. Modifications, combinations and deletions of the configurations without departing from the spirit of the present invention should be construed as being encompassed by the present invention. Further, the configurations shown in the embodiments can be combined and utilized as appropriate.

For example, in the first to fourth embodiments described above, the thin film transistor 45 has been taken to be a thin film transistor in which an oxide semiconductor is used for the channel layer. However, in the thin film transistor 45, a silicon semiconductor may be used for the channel layer.

The liquid crystal driving method of the liquid crystal display device has been taken to be a vertical alignment (VA) method, but the driving method is not limited to this. Besides the VA method, liquid crystal driving methods for the liquid crystal display device can include longitudinal electric field methods or oblique electric field methods, such as HAN (hybrid-aligned nematic), TN (twisted nematic), OCB (optically compensated bend), CPA (continuous pinwheel alignment), ECB (electrically controlled birefringence), or TBA (transverse bent alignment). A method can be appropriately selected and used.

The black electrodes 4, i.e. the metal layer patterns 2 have been taken to be scanning electrodes, and the transparent electrode patterns 6 have been taken to be detection electrodes.

However, the roles of detection electrodes and driving electrodes may be switched. For example, the transparent electrode patterns 6 may serve as the scanning electrodes, and the black electrodes may serve as the detection electrodes. Alternatively, in the perpendicular arrangement, the forming directions of the transparent electrode patterns 6 and the black electrodes perpendicular to each other may be switched.

REFERENCE SIGNS LIST

1: first light absorptive resin layer pattern
1a, 2a, 3a: pixel opening portion (opening portion)
2: metal layer pattern
3: second light absorptive resin layer pattern
5: transparent resin layer
6: transparent electrode pattern
10: first transparent substrate
10a: main surface (surface)
16: auxiliary conductor
22, 22A, 22B: substrate for a liquid crystal display device (display substrate)
23, 23B: array substrate
24: liquid crystal layer
25, 25a, 25b: pixel electrode
28, 28a: insulating layer
40: metal wiring
45: thin film transistor
46: channel layer
56a, 56b: auxiliary capacitance electrode
100: liquid crystal display device
110, 111, 112: display portion
120: control portion
B: blue pixel
G: green pixel
R: red pixel
R6, R8: superposed portion (a part)
R7, R9: protruding portion (remaining part)
X: first direction
Y: second direction
Z: stacking direction

What is claimed is:

1. A liquid crystal display device comprising:
a display unit that has a display substrate, a liquid crystal layer, and an array substrate laminated therein in this order; and
a control unit that controls the display unit and a touch sensing function,
wherein the display substrate has a first transparent substrate, and has a plurality of first light absorptive resin layer patterns having openings formed therein, a plurality of metal layer patterns having openings formed therein, a plurality of second light absorptive resin layer patterns having openings formed therein, a transparent resin layer, and a plurality of transparent electrode patterns that are electrically isolated, laminated in this order on a surface of the first transparent substrate, the surface of the first transparent substrate facing the liquid crystal layer,
the plurality of first light absorptive resin layer patterns, the plurality of metal layer patterns, and the plurality of second light absorptive resin layer patterns are formed into the same shape and with the same image line width and are in alignment, when viewed in a laminating direction along which the display substrate, the liquid crystal layer, and the array substrate are laminated,
the plurality of metal layer patterns are arrayed in a first direction perpendicular to the laminating direction, being insulated from each other,
the plurality of transparent electrode patterns are arrayed in a second direction perpendicular to the laminating direction and the first direction, being insulated from each other,
each metal layer pattern has at least one of an alloy layer mainly containing copper, and a copper layer,
the array substrate has a second transparent substrate, and has a pixel electrode, a thin film transistor, a metal wiring, and a plurality of insulating layers provided on a surface of the second transparent substrate, the surface of the second transparent substrate facing the liquid crystal layer,
the liquid crystal layer is driven by a longitudinal electrical field between a transparent electrode having the transparent electrode patterns and the pixel electrode,
wherein the thin film transistor includes a channel layer that contains two or more metal oxides among gallium, indium, zinc, tin, and germanium,
in the touch sensing function, a transparent electrode is a detection electrode with a constant potential, being grounded through a high resistance, the plurality of metal layer patterns being touch detecting electrodes, wherein a touch driving voltage is applied across the plurality of transparent electrode patterns and the plurality of metal layer patterns, a change in electrostatic capacitance across the metal layer patterns and the transparent electrode patterns being detected, the thin film transistor being configured to hold the touch driving voltage, and
wherein the plurality of metal layer patterns have a terminal part over the display substrate, the second light absorptive resin layer pattern is removed in the terminal part, and a terminal cover made of an electrically conductive film of the transparent electrode pattern is laminated over the metal layer pattern, and
wherein a frequency of a liquid crystal driving voltage applied between the transparent electrode at a constant electrical potential and the pixel electrode is different from that of the touch driving voltage.

2. The liquid crystal display device of claim 1,
wherein the array substrate includes the pixel electrode, and an auxiliary capacitance electrode disposed on an opposite side to the liquid crystal layer,
wherein each auxiliary capacitance electrode forms, in plan view, an overlap with the pixel electrode and an extension of the auxiliary capacitance electrode, wherein in plan view, the extension extends past a distal end of the pixel electrode,
wherein the overlaps as well as the extensions are line-symmetrically disposed with respect to a center line dividing the opening of the first light absorptive resin layer patterns, the metal layer patterns and the second light absorptive resin layer patterns into two, and
wherein a voltage different from the liquid crystal driving voltage is applied to each auxiliary capacitance electrode.

3. The liquid crystal display device of claim 1,
wherein each metal layer pattern is configured of a plurality of layers, and
wherein at least one of the plurality of layers is the alloy layer.

4. The liquid crystal display device of claim 1,
wherein each metal layer pattern has the alloy layer, and
wherein an alloy element contained in the alloy layer is one or more elements selected from magnesium, calcium, titanium, molybdenum, indium, tin, zinc, aluminum, beryllium, and nickel.

5. The liquid crystal display device of claim 1,
wherein each metal layer pattern is configured of a plurality of layers, and
wherein among the plurality of layers, the layer nearest to the second transparent substrate is a copper-indium alloy layer.

6. The liquid crystal display device of claim 1,
wherein auxiliary conductors having resistivity smaller than resistivity of the plurality of transparent electrode patterns are provided on the transparent electrode patterns.

7. The liquid crystal display device according to claim 1,
wherein the openings of the first light absorptive resin layer patterns, the openings of the metal layer patterns, and the openings of the second light absorptive resin layer patterns are each provided with any of a red pixel formed of a red layer, a green pixel formed of a green layer, and a blue pixel formed of a blue layer, and
wherein the red pixel, the green pixel, and the blue pixel are inserted between the plurality of metal layer patterns and the transparent resin layer in the laminating direction, and are arranged adjacently to each other when viewed in the laminating direction.

8. The liquid crystal display device of claim 1,
wherein liquid crystal molecules contained in the liquid crystal layer exhibit negative dielectric anisotropy and are initially aligned in a vertical direction.

9. A liquid crystal display device comprising:
a display unit that has a display substrate, a liquid crystal layer, and an array substrate laminated therein in this order; and
a control unit that controls the display unit and a touch sensing function,
wherein the display substrate has a first transparent substrate, and has a plurality of first light absorptive resin layer patterns having openings formed therein, a plurality of metal layer patterns having openings formed therein, a plurality of second light absorptive resin layer patterns having openings formed therein, a transparent resin layer, and a plurality of transparent electrode patterns that are electrically isolated, laminated in this order on a surface of the first transparent substrate, the surface of the first transparent substrate facing the liquid crystal layer,
the plurality of first light absorptive resin layer patterns, the plurality of metal layer patterns, and the plurality of second light absorptive resin layer patterns are formed into the same shape and are in alignment, when viewed in a laminating direction along which the display substrate, the liquid crystal layer, and the array substrate are laminated,
the plurality of metal layer patterns are arrayed in a first direction perpendicular to the laminating direction, being insulated from each other,
the plurality of transparent electrode patterns are arrayed in a second direction perpendicular to the laminating direction and the first direction, being insulated from each other,
each metal layer pattern has at least one of an alloy layer mainly containing copper, and a copper layer,
the array substrate has a second transparent substrate, and has a pixel electrode, a thin film transistor, a metal wiring, and a plurality of insulating layers provided on a surface of the second transparent substrate, the surface of the second transparent substrate facing the liquid crystal layer,
the touch sensing function at least includes setting the plurality of transparent electrode patterns to a constant electrical potential, applying a touch driving voltage across the plurality of transparent electrode patterns and the plurality of metal layer patterns, and detecting a change in electrostatic capacitance across the metal layer patterns and the transparent electrode patterns,
when the liquid crystal layer is driven, the plurality of transparent electrode patterns are set to a constant electrical potential, a liquid crystal driving voltage is applied across the plurality of transparent electrode patterns and the pixel electrode to drive the liquid crystal layer, and a frequency of the touch driving voltage is different from that of the liquid crystal driving voltage, and
wherein each metal layer pattern is configured of a plurality of layers, and wherein among the plurality of layers, the layer nearest to the second transparent substrate is a copper-indium alloy layer.

10. The liquid crystal display device of claim 9,
wherein the thin film transistor includes a channel layer that contains two or more metal oxides among gallium, indium, zinc, tin, and germanium.

11. The liquid crystal display device of claim 9,
wherein auxiliary conductors having resistivity smaller than resistivity of the plurality of transparent electrode patterns are provided on the transparent electrode patterns.

12. The liquid crystal display device according to claim 9,
wherein the openings of the first light absorptive resin layer patterns, the openings of the metal layer patterns, and the openings of the second light absorptive resin layer patterns are each provided with any of a red pixel formed of a red layer, a green pixel formed of a green layer, and a blue pixel formed of a blue layer, and
wherein the red pixel, the green pixel, and the blue pixel are inserted between the plurality of metal layer patterns and the transparent resin layer in the laminating direction, and are arranged adjacently to each other when viewed in the laminating direction.

13. A liquid crystal display device comprising:
a display unit that has a display substrate, a liquid crystal layer, and an array substrate laminated therein in this order; and
a control unit that controls the display unit and a touch sensing function,
wherein the display substrate has a first transparent substrate, and has a plurality of first light absorptive resin layer patterns having openings formed therein, a plurality of metal layer patterns having openings formed therein, a plurality of second light absorptive resin layer patterns having openings formed therein, a transparent resin layer, and a plurality of transparent electrode patterns that are electrically isolated, laminated in this order on a surface of the first transparent substrate, the surface of the first transparent substrate facing the liquid crystal layer, the plurality of first light absorptive resin layer patterns, the plurality of metal layer patterns, and the plurality of second light absorptive resin layer patterns are formed into the same shape and are in alignment, when viewed in a laminating direction along which the display substrate, the liquid crystal layer, and the array substrate are laminated, the plurality of metal layer patterns are arrayed in a first direction perpendicular to the laminating direction, being insulated from each other, the plurality of transparent electrode patterns are arrayed in a second direction perpendicular to the laminating direction and the first direction, being insulated from each other, each metal layer pattern has at least one of an alloy layer mainly containing copper, and a copper layer, the array substrate has a second transparent substrate, and has a pixel electrode, a thin film transistor, a metal wiring, and a plurality of insulating layers provided on a surface of the second transparent substrate, the surface of the second transparent substrate facing the liquid crystal layer, the touch sensing function at least includes setting the plurality of the transparent electrode patterns to a constant electrical potential, applying a touch driving voltage across the plurality of transparent electrode patterns and the plurality of metal layer patterns, and detecting a change in electrostatic capacitance across the metal layer patterns and the transparent electrode patterns, when the liquid crystal layer is driven, the plurality of transparent electrode patterns are set to a constant electrical potential, a liquid crystal driving voltage is applied across the plurality of transparent electrode patterns and the pixel electrode to drive the liquid crystal layer, and a frequency of the touch driving voltage is different from that of the liquid crystal driving voltage, and wherein the openings of the first light absorptive resin layer patterns, the openings of the metal layer patterns, and the openings of the second light absorptive resin layer patterns are each provided with any of a red pixel formed of a red layer, a green pixel formed of a green layer, and a blue pixel formed of a blue layer, and wherein the red pixel, the green pixel, and the blue pixel are inserted between the plurality of metal layer patterns and the transparent resin layer in the laminating direction, and are arranged adjacently to each other when viewed in the laminating direction.

14. The liquid crystal display device of claim 13, wherein the thin film transistor includes a channel layer that contains two or more metal oxides among gallium, indium, zinc, tin, and germanium.

15. The liquid crystal display device of claim 13, wherein each metal layer pattern is configured of a plurality of layers, and wherein at least one of the plurality of layers is the alloy layer.

16. The liquid crystal display device of claim 13, wherein each metal layer pattern has the alloy layer, and wherein an alloy element contained in the alloy layer is one or more elements selected from magnesium, calcium, titanium, molybdenum, indium, tin, zinc, aluminum, beryllium, and nickel.

17. The liquid crystal display device of claim 13, wherein auxiliary conductors having resistivity smaller than resistivity of the plurality of transparent electrode patterns are provided on the transparent electrode patterns.

\* \* \* \* \*